(12) United States Patent
Ehrenberg et al.

(10) Patent No.: US 8,470,071 B2
(45) Date of Patent: Jun. 25, 2013

(54) ENHANCED HVAC SYSTEM AND METHOD

(75) Inventors: Scott G. Ehrenberg, Port Richey, FL (US); Hung Huynh, Port Richey, FL (US); Brian Johnson, Land O'Lakes, FL (US)

(73) Assignee: Dais Analytic Corporation, Odessa, FL (US)

( * ) Notice: Subject to any disclaimer, the term of this patent is extended or adjusted under 35 U.S.C. 154(b) by 1053 days.

(21) Appl. No.: 12/442,582

(22) PCT Filed: Sep. 25, 2007

(86) PCT No.: PCT/US2007/079428
§ 371 (c)(1),
(2), (4) Date: May 6, 2009

(87) PCT Pub. No.: WO2008/039779
PCT Pub. Date: Apr. 3, 2008

(65) Prior Publication Data
US 2010/0031817 A1  Feb. 11, 2010

Related U.S. Application Data

(60) Provisional application No. 60/846,747, filed on Sep. 25, 2006, provisional application No. 60/917,037, filed on May 9, 2007.

(51) Int. Cl.
*B01D 53/22* (2006.01)
*B01D 59/12* (2006.01)

(52) U.S. Cl.
USPC ............. 95/45; 95/52; 95/211; 96/4; 96/274; 96/290; 96/295; 261/105

(58) Field of Classification Search
None
See application file for complete search history.

(56) References Cited

U.S. PATENT DOCUMENTS

| | | | |
|---|---|---|---|
| 2,283,236 A | 5/1942 | Soday | |
| 2,475,886 A | 7/1949 | Goebel | |
| 2,533,211 A | 12/1950 | Baer | |
| 4,248,821 A | 2/1981 | Van Dellen | |
| 5,194,158 A * | 3/1993 | Matson | 95/46 |
| 5,239,010 A | 8/1993 | Balas et al. | |
| 5,468,574 A | 11/1995 | Ehrenberg et al. | |
| 5,679,482 A | 10/1997 | Ehrenberg et al. | |
| 5,840,387 A | 11/1998 | Berlowitz-Tarrant et al. | |
| 6,110,616 A | 8/2000 | Sheikh-Ali et al. | |

(Continued)

FOREIGN PATENT DOCUMENTS

| DE | 580366 | 7/1933 |
|---|---|---|
| WO | WO 99/61397 A2 | 12/1999 |
| WO | WO 2005/030812 | 4/2005 |
| WO | WO 2006/017245 | 2/2006 |

OTHER PUBLICATIONS

U.S. Appl. No. 60/917,037, filed May 9, 2007, Ehrenberg.
U.S. Appl. No. 60/846,747, filed Sep. 25, 2006, Ehrenberg.

(Continued)

*Primary Examiner* — Duane Smith
*Assistant Examiner* — Pankt I Patel
(74) *Attorney, Agent, or Firm* — Mueting, Raasch & Gebhardt, P.A.

(57) ABSTRACT

Particular embodiments disclosed herein relate to methods, compositions, and systems relating generally to heating, ventilation, and air conditioning (HVAC) systems, and more specifically, to HVAC systems that transfer sensible and/or latent energy between air streams, humidify and/or dehumidify air streams. In certain embodiments, a polymeric membrane is utilized for fluid exchange, with or without an additional support. Certain embodiments allow for individual regulation of air temperature and humidity.

29 Claims, 11 Drawing Sheets

U.S. PATENT DOCUMENTS

| | | | |
|---|---|---|---|
| 6,306,419 B1 | 10/2001 | Vachon et al. | |
| 6,383,391 B1 | 5/2002 | Ehrenberg et al. | |
| 6,413,294 B1 | 7/2002 | Spencer | |
| 6,413,298 B1 | 7/2002 | Wnek et al. | |
| 6,584,801 B2 | 7/2003 | Erickson | |
| 6,649,062 B1 * | 11/2003 | Petty | 210/649 |
| 6,699,941 B1 | 3/2004 | Handlin et al. | |
| 6,841,601 B2 | 1/2005 | Serpico et al. | |
| 7,001,950 B2 | 2/2006 | Handlin, Jr. et al. | |
| 7,067,589 B2 | 6/2006 | Bening et al. | |
| 7,169,848 B2 | 1/2007 | Bening et al. | |
| 7,169,850 B2 | 1/2007 | Handlin, Jr. et al. | |
| 7,179,860 B2 | 2/2007 | Cao et al. | |
| 7,186,779 B2 | 3/2007 | Joly et al. | |
| 7,459,084 B2 * | 12/2008 | Baig et al. | 210/640 |
| 2001/0042716 A1 * | 11/2001 | Iversen et al. | 210/640 |
| 2004/0099140 A1 * | 5/2004 | Hesse et al. | 96/8 |
| 2004/0142910 A1 | 7/2004 | Vachon et al. | |
| 2004/0242810 A1 | 12/2004 | Bell et al. | |
| 2005/0154144 A1 | 7/2005 | Atwood et al. | |
| 2005/0178720 A1 | 8/2005 | Pluester et al. | |
| 2005/0217303 A1 | 10/2005 | Gillan et al. | |
| 2007/0004830 A1 | 1/2007 | Flood et al. | |
| 2007/0020473 A1 | 1/2007 | Umana et al. | |
| 2007/0021569 A1 | 1/2007 | Willis et al. | |
| 2007/0026251 A1 | 2/2007 | Umana | |
| 2007/0037927 A1 | 2/2007 | Yang | |
| 2007/0055015 A1 | 3/2007 | Flood et al. | |
| 2007/0221065 A1 * | 9/2007 | Aroonwilas et al. | 96/243 |
| 2007/0256969 A1 * | 11/2007 | Ding et al. | 210/490 |
| 2009/0081079 A1 * | 3/2009 | Johns | 422/46 |

OTHER PUBLICATIONS

International Search Report and Written Opinion dated Apr. 17, 2008 from related International Patent Application No. PCT/US2007/079428, 10 pgs.

Gilbert, Everett, "The Reactions of Sulfur Trioxide, and of its Adducts, with Organic Compounds," *Chemical Review*, Dec. 1962; 62(6): 549-589.

Jenkins et al., "Glossary of Basic Terms in Polymer Science," *International Union of Pure Applied Chemistry*, 1996; 68(12);2287-2311.

Odian, G.; "Principles of Polymerization"; $3^{rd}$ Edition; 1991; 16 pgs. Table of Contents and pp. 352-353.

Ring et al., "Source-Based Nomenclature for Copolymers," *International Union of Pure Applied Chemistry*, 1985;57(10):1427-1440.

Samms et al., "Thermal Stability of Proton Conducting Acid Doped Polybenzimidazole in Simulated Fuel Cell Environments," *J Electrochem Soc.*, Apr. 1996;143(4):1225-1232.

Wainright et al., "Acid-Doped Polybenzimidazoles: A New Polymer Electrolyte," *J Electrochem Soc.*, Jul. 1995;142(7):L121-L-123.

Wang et al., "Real-Time Mass Spectrometric Study of the Methanol Crossover in a Direct Methanol Fuel Cell," *J Electrochem Soc.*, Apr. 1996; 143(4): 1233-1239.

Weng et al., "Electro-osmotic Drag Coefficient of Water and Methanol in Polymer Electrolytes at Elevated Temperatures," *J Electrochem Soc.*, Apr. 1996; 143(4): 1260-1263.

Zecevic et al., "Kinetics of $O_2$ Reduction on a Pt Electrode Covered with a Thin Film of Solid Polymer Electrolyte," *J Electrochem Soc.*, Sep. 1997; 144(9):2973-2982.

Brust, "Ionomers," [online]. Polymer Science Learning Center, Department of Polymer Science, The University of Southern Mississippi, 2005 [retrieved on Oct. 22, 2012]. Retrieved from the Internet<URL:http://pslc.ws/macrog/ionomer.htm>; 4 pgs.

"Ionomer," Wikipedia [online]. Wikimedia, Inc., San Francisco, CA [retrieved on Oct. 22, 2012]. Retrieved from the Internet<URL:http://en.wikipedia.org/wiki/Ionomer>; 1 page. (Page last modified on Jun. 29, 2012).

* cited by examiner

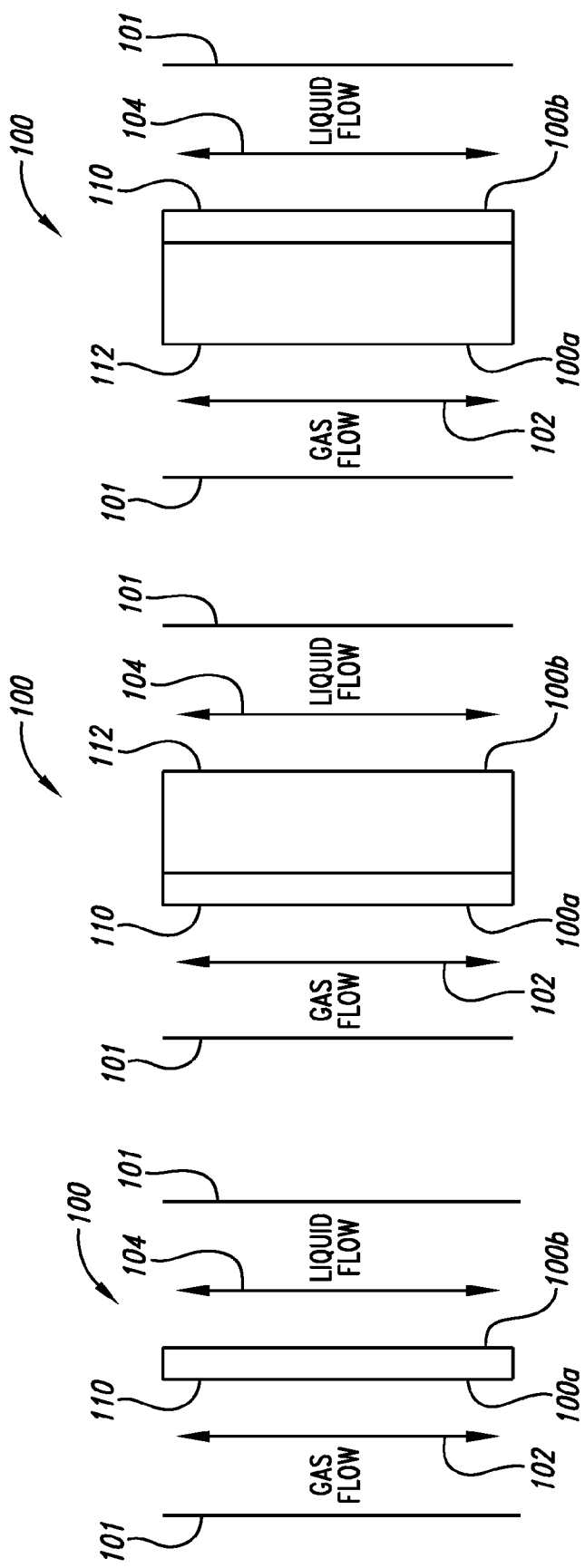

ENHANCED HVAC SYSTEM AND METHOD

CROSS REFERENCE TO RELATED APPLICATIONS

This application is the §371 U.S. National Stage of International Application No. PCT/US2007/079428, filed 25 Sep. 2007, which claims priority from U.S. Provisional Application Serial No. 60/846,747, filed Sep. 25, 2006 and U.S. Provisional Application No. 60/917,037, filed 9 May 2007, each of which is incorporated herein by reference in its entirety.

BACKGROUND OF THE INVENTION

1. Field of the Invention

The present invention relates generally to the field of heating, ventilation, and air conditioning (HVAC).

2. Description of the Related Art

Existing HVAC systems use heat of condensation and/or heat of vaporization of a liquid, such as water, to adjust temperature and humidity within a structure such as a dwelling, building, vehicle or other region such as for a localized environment or functioning apparatus. Conventional HVAC systems can have evaporative cooling towers, which dissipate heat carried by a liquid, such as water, by evaporating a portion of the liquid.

Unfortunately, the evaporative cooling towers can be costly to maintain involving cleaning of evaporative surfaces and remedying build up of toxic salts and metals in water supplies. Other challenges are involved when attempts are made to scale down evaporative cooling towers for smaller sized applications. Often smaller scaled operations are forced to forego use of evaporative cooling towers because of size scaling issues. Consequently, efficiency of these smaller applications can suffer.

Conventional HVAC systems can also use condensing heat exchangers to remove heat from a region by condensing out a portion of a gas, such as water vapor, present in the region. The conventional condensing heat exchangers provide surface area for condensation to occur. Unfortunately, liquid already condensed on a portion of the surface can interfere with further condensation thereby hindering efficiencies.

BRIEF DESCRIPTION OF THE SEVERAL VIEWS OF THE DRAWING(S)

FIG. 5 is a schematic view of the mass exchanger of FIG. 1 in a membrane-only implementation.

FIG. 6 is a schematic view of the mass exchanger of FIG. 1 in a gas-side membrane implementation of a dual layer version of the mass exchanger of FIG. 1.

FIG. 7 is a schematic view of the mass exchanger of FIG. 1 in a liquid-side membrane implementation of a dual layer version of the mass exchanger of FIG. 1.

DETAILED DESCRIPTION OF THE INVENTION

Figure 1:
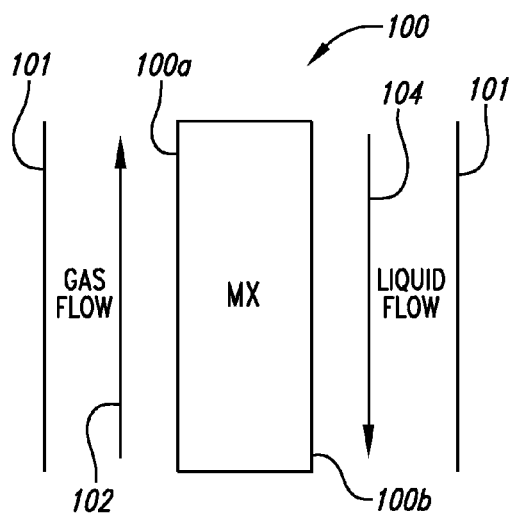
FIG. 1 is a schematic view of a membrane based mass exchanger according to the present invention showing a first fluid flow configuration.

An enhanced HVAC system and method incorporates one or more membrane based mass exchangers along with conventional components to provide potential maintenance and efficiency advantages. The mass exchangers include a selective transport membrane that allows only one or more selected liquids and gases to pass therethrough.

When used in a liquid-to-gas phase-change mode (an enthalpy desorber) as an alternative to a conventional evaporative cooling tower, a portion of a liquid, such as water from a water stream, is allowed to pass through the membrane of the mass exchanger as a gas without need of a conventional evaporative surface thereby offering potential reductions in maintenance burdens and potential greater ease in applying to smaller sized applications.

When used in a gas-to-liquid phase-change mode (an enthalpy absorber) as an alternative to a conventional condensing heat exchanger, a portion of a gas, such as water vapor, is allowed to pass through the membrane as the gas, such as water vapor, and to condense directly into a liquid, such as a flowing water stream, without need of a conventional condensation surface thereby offering potential increases in efficiencies.

Even though the function of the mass exchanger as enthalpy desorber and enthalpy absorber differ, the designs of the mass exchangers do not differ in significant detail. Each mass exchanger includes a membrane between a moving stream of water and a moving stream of air. In one embodiment, the membrane through such implementations has a layer of specialized ionomeric polymer and optional hydrophobic microporous support creates a selectively permeable barrier. The membrane has the ability to exclude many airborne organic and/or inorganic particulates and/or gases such as oxygen, nitrogen, argon, carbon dioxide, or others, while selectively transferring liquid, such as water. This ability allows the exchanger to desorb only moisture from a moving stream of water that has a temperature that is above the wet bulb temperature of the moving air stream in contact with the membrane.

The membrane protects the coolant water from contamination reducing or eliminating the need for chemicals to prevent biological contamination such as mold growth. This minimizes the maintenance that the system requires. The membrane also does not change its transport properties as the dissolved solids content increases. Higher concentrations of salt or other metals within the circulating water can be tolerated by this system. The reduced levels of chemicals, resistance to biological contamination and tolerance to dissolved solids allow disposal of the circulating water down a municipal drain. In addition, the enthalpy absorber is a net producer of filtered water as it absorbs moisture from the atmosphere. This water can be pumped into the enthalpy desorber reservoir to reduce the concentration of dissolved solids that are circulating.

In particular implementations, the enthalpy desorber fulfills a role of an evaporation tower in a large chilled water system of conventional design. Evaporation of warm water through the selective membrane transfers latent energy to the uncontrolled outside air, removing that energy from the conditioning system. This evaporative cooling confers a substantial performance advantage over typical sensible-only heat exchangers used in the vast majority of applications. Sensible heat exchangers operate with their working fluid, usually an inert refrigerant at high pressure, at temperatures higher than the dry bulb temperature of the uncontrolled outside air to ensure heat rejection into the warm outside air. The enthalpy desorber functions as long as the water temperature is above the wet-bulb temperature of the air, allowing an approximately 20-30 Degrees Celsius reduction in the condensing temperature of the refrigerant. Since the condensing temperature is directly linked to the refrigerant pressure this translates into a dramatic reduction in the mechanical work input at the refrigerant compressor.

The water desorption will lower the temperature of the moving stream of water through the heat of evaporation. Sensible energy is also transferred through the direct contact of water and air to the membrane which will conduct thermal energy.

As described below, the membrane used can be made from a number of materials such as a layer of specialized ionomeric polymer. The optional support described can be made from hydrophobic or hydrophilic microporous support. The combination of membrane and support can create a selectively permeable barrier. As with the mass exchanger being in the gas-to-liquid phase change mode, also known as an enthalpy absorber, the liquid temperature, such as of a moving water stream, is below the dew point of the gas, such as containing air and water. The gas flow diffuses through the support into the membrane, such as an ionomeric polymer, and condenses directly into the fluid flow, such as a water stream. This condensing vapor can warm a water stream as it returns to a refrigerant heat exchanger. Sensible (thermal) energy also can be transferred by the membrane between an air stream and the water stream.

The membrane can operate bi-directionally. If a moving liquid (e.g. water) stream is above the wet bulb temperature of the moving air stream and preferentially above the sensible dry bulb temperature of the air stream, liquid (e.g. water) will desorb from the moving stream of water into the moving stream of air. The water desorption will cool the moving water stream through the heat of vaporization providing most of the energy transfer. Again, sensible energy is also transferred through the direct contact of air and water to the membrane which will conduct thermal energy.

In a preferred embodiment, the ionomeric polymers that can make up the membrane typically have equivalent acid molecular weights below 1200 units, exhibit high selectivity for water, and form uniform thin structures that can be free standing or laminated or otherwise attached to an optional support. In certain preferred embodiments, the ionomers also have chemistries that allow radiation or chemical crosslinking to immobilize the molecules within the membrane and confer specialized mechanical and permeation properties. The membranes made from these ionomers have the ability to exclude many airborne organic and/or inorganic particulates and/or gases such as oxygen, nitrogen, argon, and/or carbon dioxide while selectively transferring liquid, such as water. Since the membrane(s) are typically thin, a support is used when the mechanical forces and stresses require it. The support can have the characteristics of hydrophobicity or hydrophilicity depending on the specific requirements of the application. In addition these supports have high porosity thus allowing transfer of gas across the support. The porosity can vary from 10% to 99.99% by weight or volume or greater. In these preferred embodiments, the membranes allow the mass exchanger to absorb moisture into a moving stream of liquid (e.g. water) that has a temperature that is less than the dew point of the air stream in contact with the membrane. The absorption of the liquid (e.g. water) will raise the temperature of the moving stream of liquid (e.g. water) through the heat of condensation. Sensible energy is also transferred through the direct contact of air and water to the membrane which will conduct thermal energy.

In one preferred embodiment, the membrane comprises at least one layer of ionomeric organic-inorganic hybrid polymer bonded to a hydrophobic microporous support. This ionomeric layer which is also known as a stand-alone membrane is described as a macromolecule that has undergone modification, such as sulfonation, phosphorylation, or amidization. The sulfonation, phosphorylation, or amidization covalently bonds ionic groups to the macromolecule. These ionic groups are balanced by an opposite polarity free ion that is held in place by the Coulombic force that accompanies opposite polarity charges. Thus the molecule has no net charge yet has a high charge density consisting of balanced covalently bound positive charges and free negative ions (sulfonated or phosphorylated) or covalently bound negative charges and free positive ions (amidated).

The mass exchangers may be constructed in one of any number of forms. One form of the mass exchanger uses membrane comprising cartridges shown below that can be thought of flattened oblong tubes. Here the moving air stream passes over the outside of the cartridge while the water stream is routed through the inside of the cartridge. In the cartridge design the water can be in direct contact with the membrane or have an air gap between the water stream and the membrane. The cartridge system simplifies the exchanger construction.

A second form of the mass exchangers is a prismatic plate design shown below. Here dividers called "flow fields" create water channels and air channels on opposite sides of the membrane. These dividers, typically rectangular or square in shape, have water and air distribution features called plenums. Each membrane layer has a flow field on either side of it delivering air and water to its faces. Flow fields and membrane are stacked prismatically and bolted end plates complete the exchanger. Water lines are coupled through the end plates to the water plenums on each flow field, which then distributes the water across the ionomeric face of the membrane. The air plenums allow air from outside the exchanger to pass over the opposite face of the membrane.

The simplified construction of the cartridge form of the exchanger system results from looser tolerances for the cartridges. In the prismatic plate design example the seals and membrane support are dependant on each flow field being uniformly thick and having membrane contact surfaces with are highly parallel across each face compared to the opposing face. A deviation from thickness or parallelism can create sealing problems if too thin or crush the membrane if too thick or non-parallel. The cartridges seal independently, with no clamping force being transmitted from one to another, and do not need to be held to such tight tolerances.

An exemplary mass exchanger 100 is shown in FIG. 1 as having a gas-side surface 100*a* and a liquid-side surface 100*b*. The mass exchanger 100 is depicted as being exposed to counter-directional flows directed by flow structures 101, such as channels, piping, plenums, and the like, with the gas-side surface 100*a* being exposed to a gas flow 102 and the liquid-side surface 100b being exposed to a liquid flow 104 in a direction substantially opposite to the gas flow.

Figure 2:
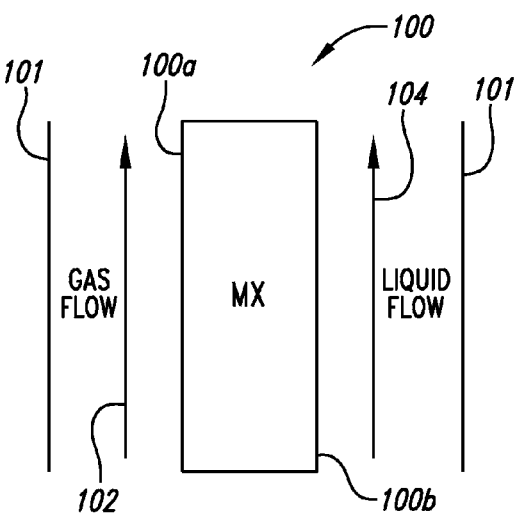
FIG. 2 is a schematic view of the mass exchanger of FIG. 1 showing a second fluid flow configuration.

The mass exchanger 100 is depicted in FIG. 2 as being exposed to common-directional flows directed by the flow structures 101 with the gas-side surface 100a being exposed to the gas flow 102 and the liquid-side surface 100b being exposed to the liquid flow 104 in a direction substantially the same as the gas flow.

Figure 3:
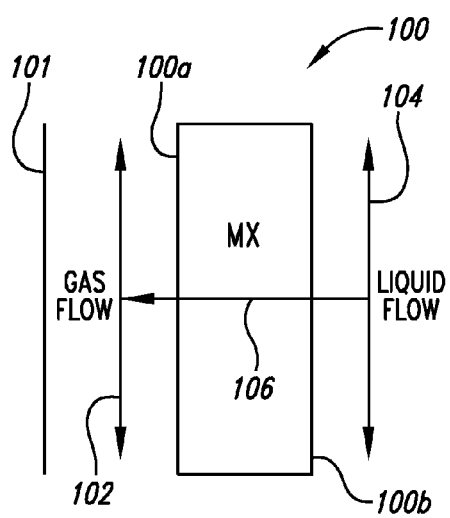
FIG. 3 is a schematic view of the mass exchanger of FIG. 1 used in a liquid-to-gas phase-change mode.

The mass exchanger 100 is depicted in FIG. 3 as being in the liquid-to-gas phase-change mode in which liquid from the liquid flow 104 passes through the mass exchanger as gas 106 to join with the gas flow 102.

Figure 4:
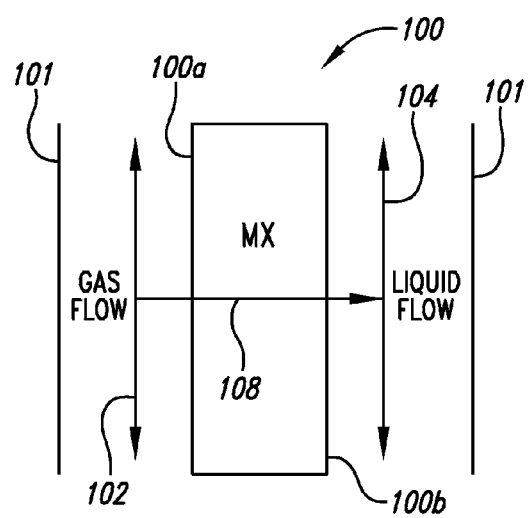
FIG. 4 is a schematic view of the mass exchanger of FIG. 1 used in a gas-to-liquid phase-change mode.

The mass exchanger 100 is depicted in FIG. 4 as being in the gas-to-liquid phase-change mode in which gas from the gas flow 102 passes through the mass exchanger as a gas 108 to condense into the liquid flow 102.

The mass exchanger 100 is depicted in FIG. 5 as being in a membrane-only implementation of the mass exchanger having a selective transport membrane 110 with a first surface of the membrane being the gas-side surface 100a of the mass exchanger and a second surface of the membrane being the liquid-side surface 100b of the mass exchanger. The gas-side surface 100a is shown being exposed to the gas flow 102 and the liquid-side surface 100b is shown being exposed to the liquid flow 104 with the gas flow and the liquid flow shown as either counter-directional or common-directional flows.

The mass exchanger 100 is depicted in FIG. 6 as being in a gas-side membrane implementation of a dual layer version of the mass exchanger with the selective transport membrane 110 coupled with a support 112. A first surface of the membrane 110 is the gas-side surface 100a of the mass exchanger and a first surface of the support 112 is the liquid-side surface 100b of the mass exchanger. The gas-side surface 100a is shown being exposed to the gas flow 102 and the liquid-side surface 100b is shown being exposed to the liquid flow 104 with the gas flow and the liquid flow shown as either counter-directional or common-directional flows.

The mass exchanger 100 is depicted in FIG. 7 as being in a liquid-side membrane implementation of a dual layer version of the mass exchanger with the selective transport membrane 110 coupled, such as through a hermetic seal, with a support 112. A first surface of the support 112 is the gas-side surface 100a of the mass exchanger and a first surface of the membrane 110 is the liquid-side surface 100b of the mass exchanger. The gas-side surface 100a is shown being exposed to the gas flow 102 and the liquid-side surface 100b is shown being exposed to the liquid flow 104 with the gas flow and the liquid flow shown as either counter-directional or common-directional flows.

Figure 8:
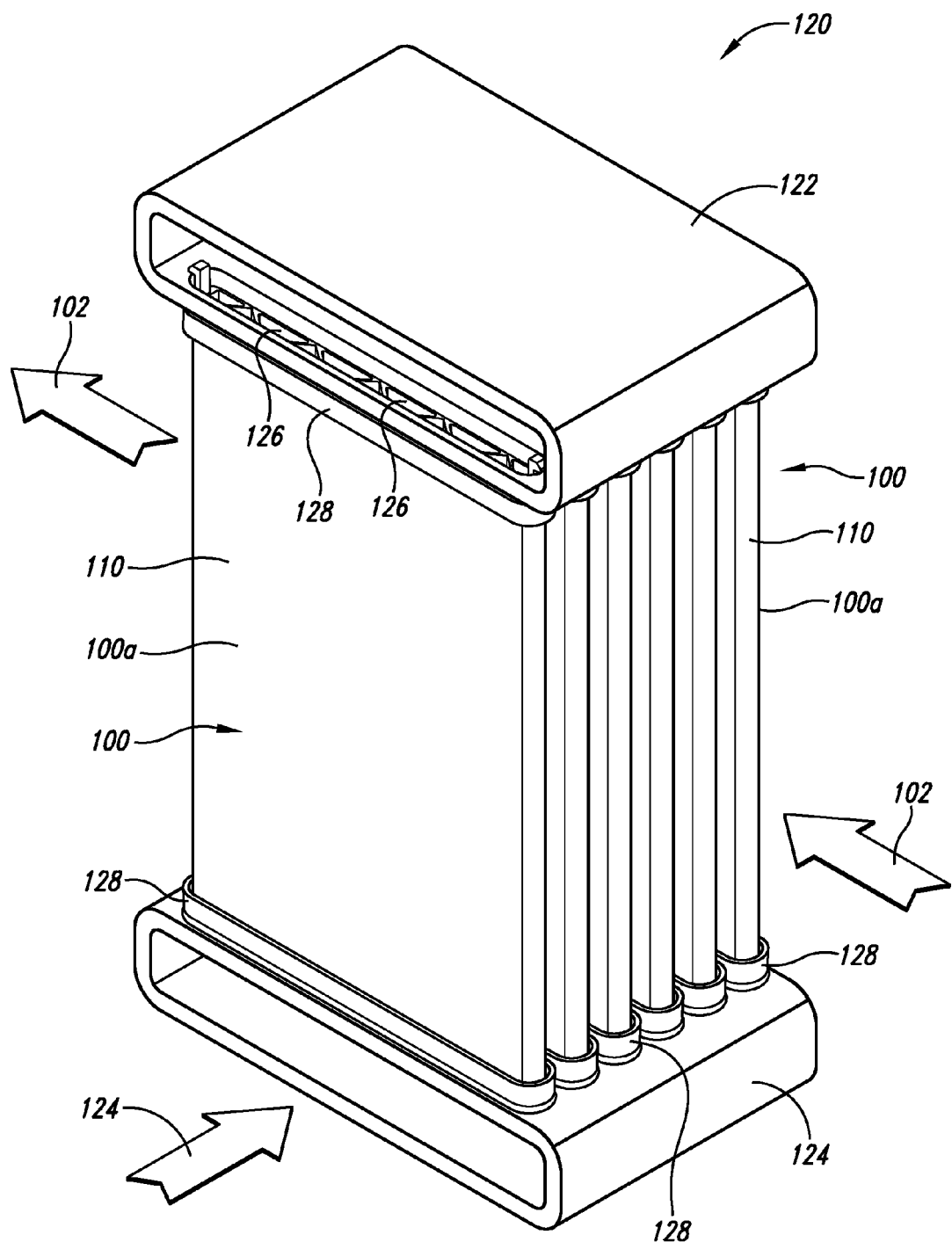
FIG. 8 is a perspective view of a manifold style of mass exchanger using multiple tubular cartridges to convey the liquid flow.
Figure 9:
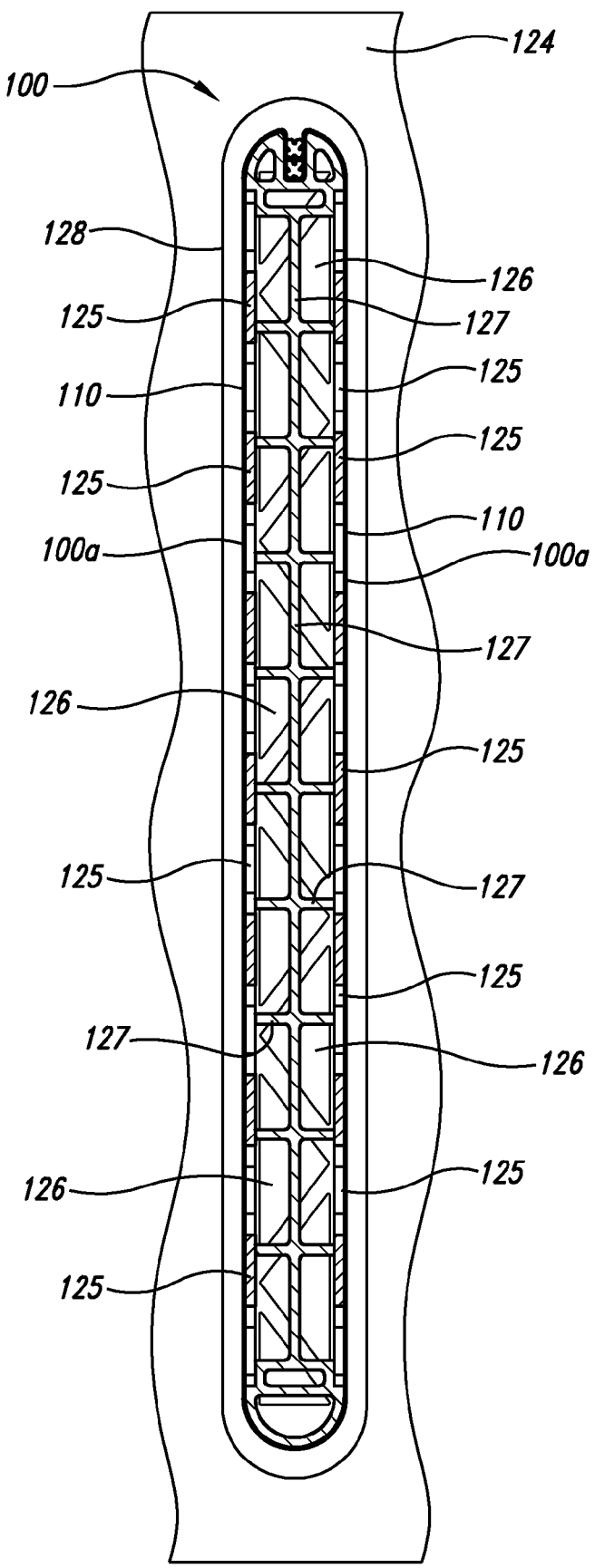
FIG. 9 is a top plan cross-sectional view of an individual tubular cartridge from the mass exchanger of FIG. 8.
Figure 9A:
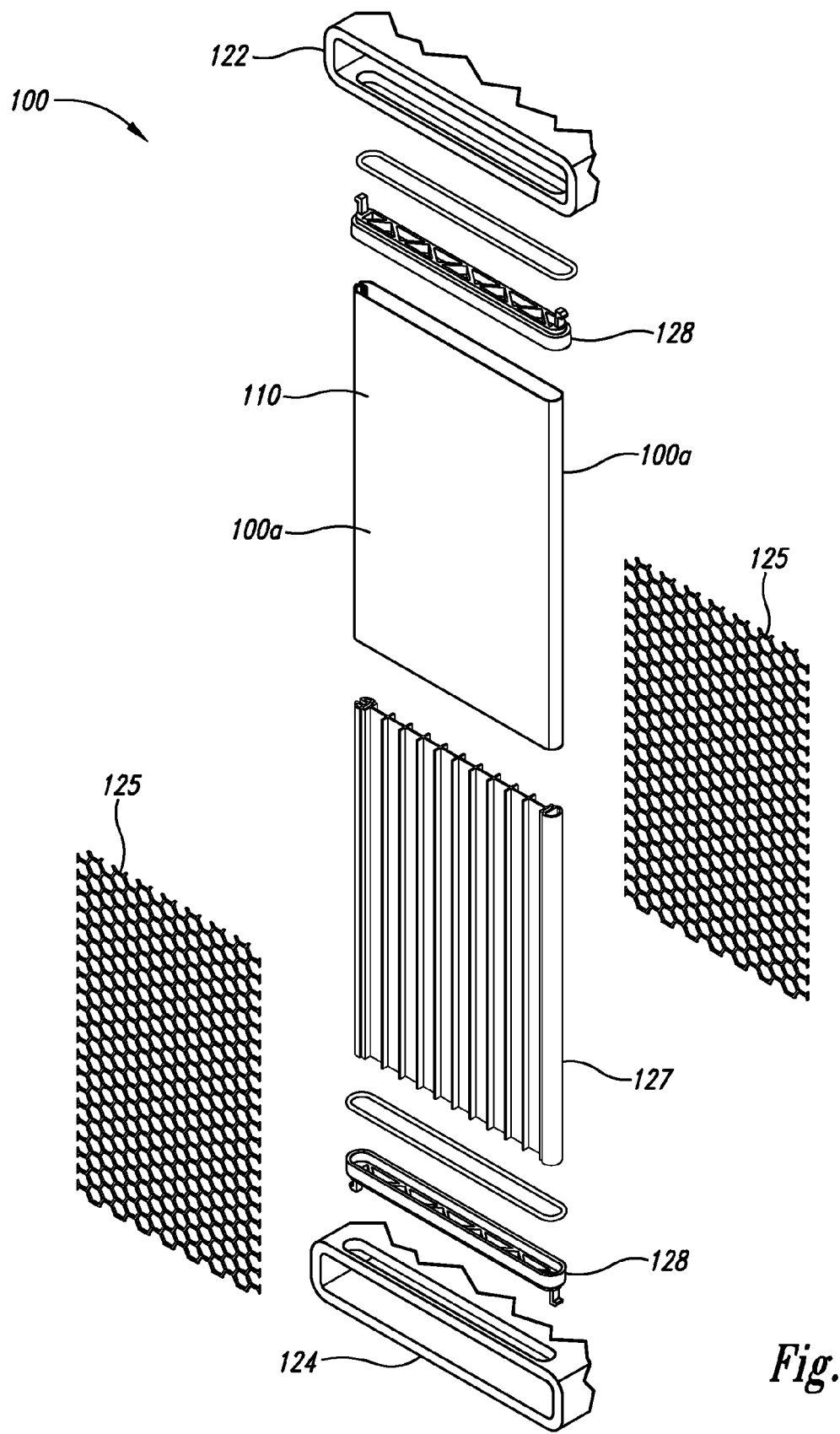
FIG. 9A is an exploded perspective view of FIG. 9.

A manifold style of the gas-side membrane implementation of the dual layer version of the mass exchanger 100 is shown in FIG. 8 as having a plurality of the mass exchangers coupled with an intake fluid manifold 122 and an exit manifold 124. Each of the mass exchangers 100 has its own separate membrane. As shown in FIGS. 9 and 9A, the membrane 110 is located on the exteriorly located. A lattice 125 may be included to provide rigidity where needed. The channels 126 receive a respective portion of the liquid flow 104 from the intake manifold 122 and to channel the liquid flow to the exit manifold 124. The mass exchangers 100 are spaced sufficiently apart to allow for passage of the gas flow 102 therebetween. An optional divider 127 may be present, as well as an optional coupler 128 that may couple the cartridge and the manifold.

Figure 10:
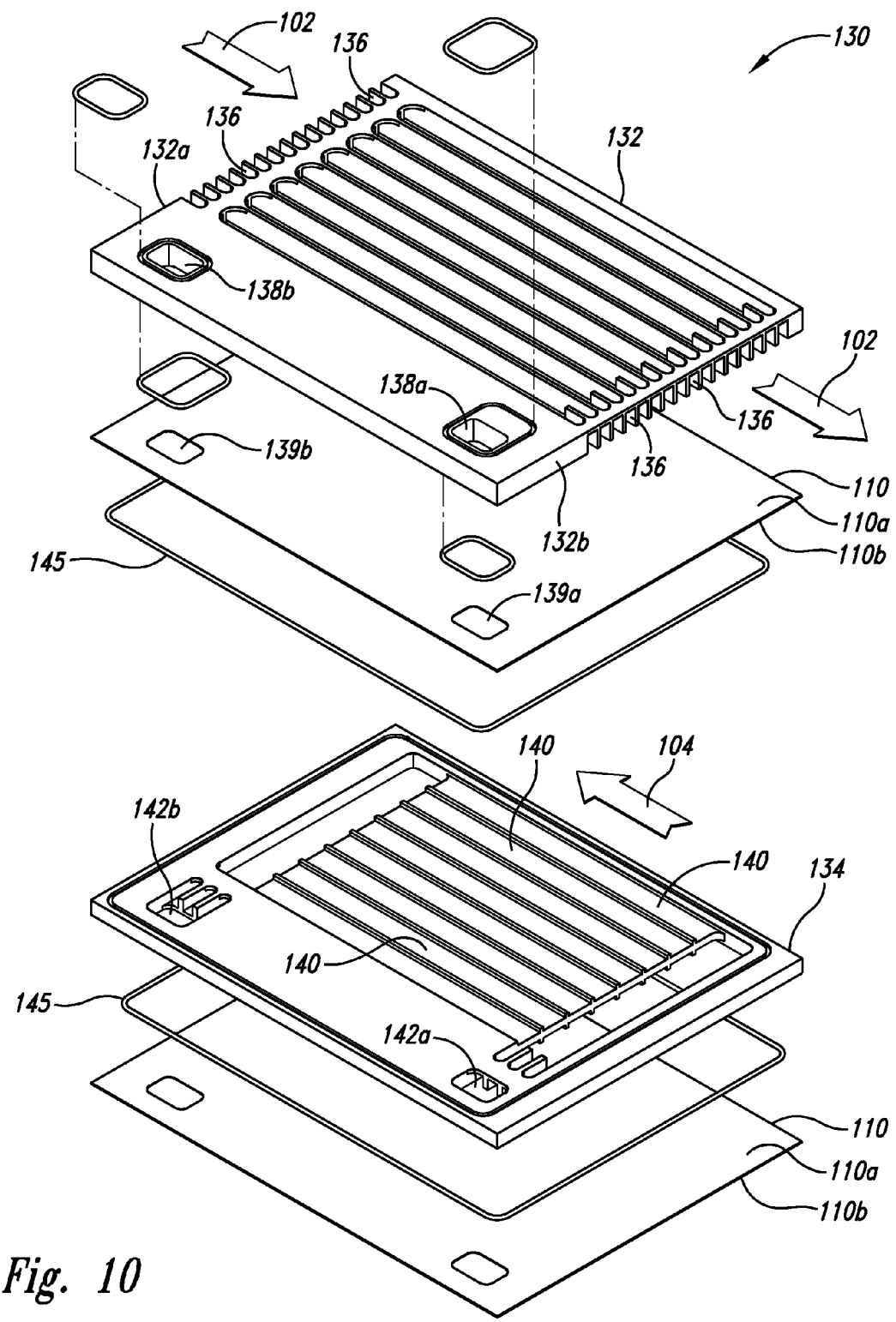
FIG. 10 is an exploded perspective view of a plate style of a membrane-only implementation of the mass exchanger.

A plate style of a membrane-only implementation of the mass exchanger 100 is shown in FIG. 10 has having a gas plate 132, a liquid plate 134, and the membrane 110 therebetween. The depicted plate style of the mass exchanger 100 allows for stacking together of a plurality of such mass exchangers so that in an alternating fashion an instance of the gas plate 132 is positioned in juxtaposition with an instance of the liquid plate 134 (with an instance of the membrane 110 positioned therebetween), which is positioned in juxtaposition with another instance of the gas plate 132 (with another instance of the membrane positioned therebetween) and so on, The gas plate 132 has channels 136 to allow for the gas flow 102 to move past the gas-side 110a of the two instances of the membrane 110 positioned on either side of the gas plate and exit therefrom. The gas plate 132 further includes an intake plenum aperture 138a and an exit plenum aperture 138b that pass the liquid flow 104 therethrough to allow for stacking of a plurality of the depicted plate style mass exchanger 100. The membrane 110 also includes an intake plenum aperture 139a and an exit plenum aperture 139b that pass the liquid flow 104 therethrough to allow for stacking of a plurality of the depicted plate style mass exchanger 100.

Each of the liquid plates 134 in a stack of the depicted plate style mass exchangers 100 has channels 140 to allow the liquid flow 104 to move past the liquid-side 100b of both of the membranes 110 adjacent to the liquid plate. Each of the liquid plates 134 in a stack of the depicted plate style mass exchangers 100 has an intake plenum aperture 142a and an exit plenum aperture 142b. The intake plenum aperture 142a receives the liquid flow 104 from one or both of the intake plenum apertures 139a of the membranes 110 adjacent to the liquid plate. The exit plenum aperture 142b delivers the liquid flow 104 to one or both of the exit plenum apertures 139b of the membranes 110 adjacent to the liquid plate. The intake plenum aperture 142a of the liquid plate 134 delivers the liquid flow 104 to the channels 140 that In turn deliver the liquid flow 104 to the other of the exit plenum aperture 142b of the liquid plate. The optional gaskets 145 may seal the plates.

Figure 11:
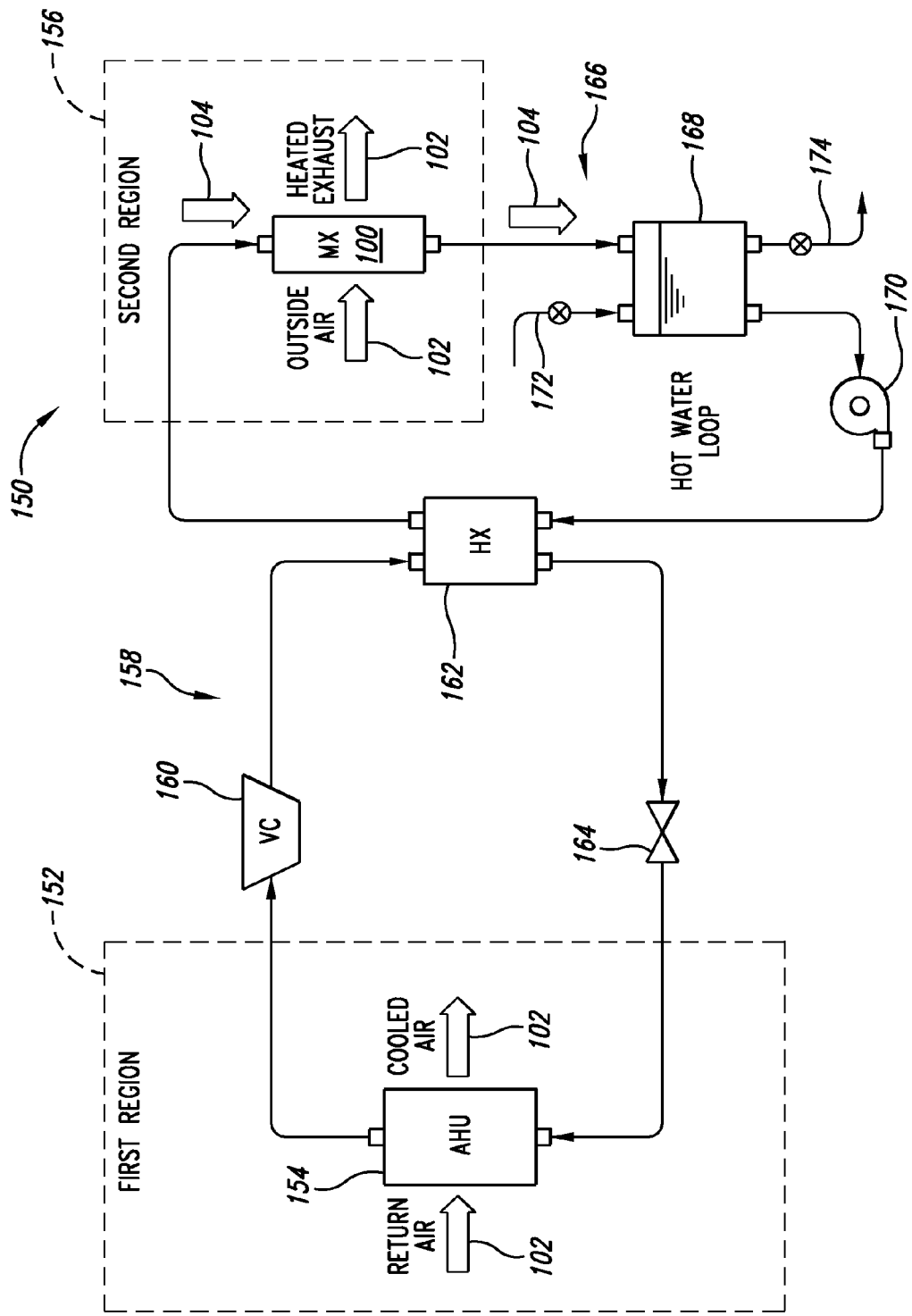
FIG. 11 is a schematic view of a first implementation of an enhanced HVAC system.

A first implementation 150 of an enhanced HVAC system is shown in FIG. 11 and has a first region 152 in which is located a conventional air handling unit (AHU) 154 and a second region 156 in which is located one of the mass exchangers 100 configured in the liquid-to-gas phase-change mode. The AHU 154 is part of a first loop 158, which uses a gas working fluid to receive heat from the first region through the AHU. The first loop 158 further includes a vapor compressor 160, a gas-to-liquid heat exchanger 162, and an expansion valve 164. The vapor compressor 160 receives heated gas working fluid from the AHU 154 and compresses the gas working fluid to be sent on to the gas-to-liquid heat exchanger (HX) 162 to release heat from the gas working fluid to a liquid, such as water, recirculating in a second loop 166.

The second loop 166 further includes an instance of the mass exchanger (MX) 100 configured in the liquid-to-gas phase-change mode, a liquid reservoir 168, and a circulation pump 170. The gas flow 102 from gas found in the second region passes through the mass exchanger 100 by which a portion of the recirculation liquid in the second loop 166 is transferred as a gas into the gas flow thereby releasing heat from the recirculation liquid to the gas of the second region. The liquid levels of the liquid reservoir 168 are controlled through a supply line 172 and a drain line 174 to maintain an adequate amount and temperature of the circulating fluid in the second loop 166. The recirculation pump 170 moves the circulating fluid through the second loop 166.

Figure 12:
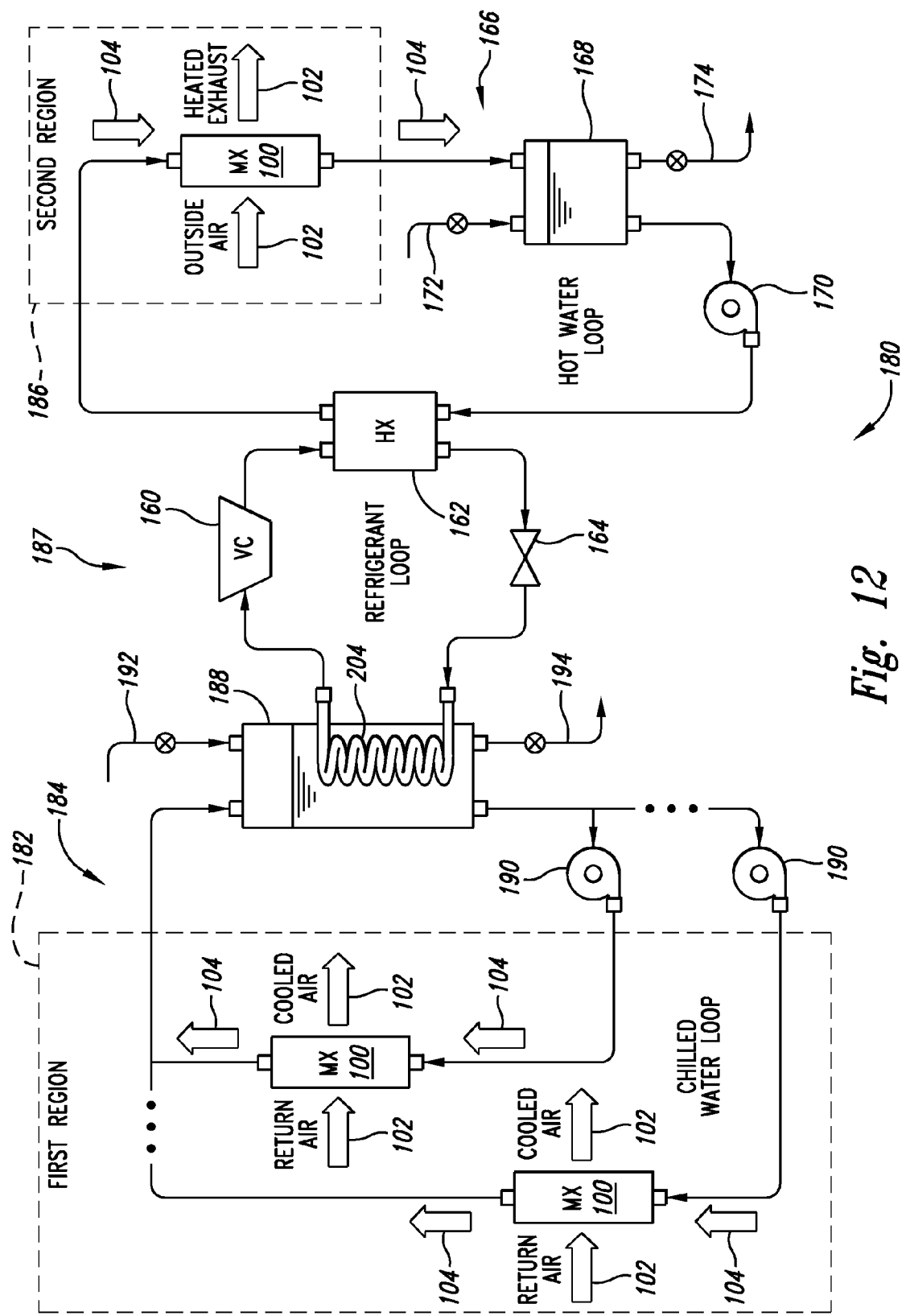
FIG. 12 is a schematic view of a second implementation of the enhanced HVAC system.

A second implementation 180 of an enhanced HVAC system is shown in FIG. 12 and has a first region 182 which includes part of a first (e.g. chilled water) loop 184, a second region 186, which includes part of the second loop 166, and a third (e.g. refrigerant) loop 187 that could be located in the first region, the second region, or elsewhere. Located in the first region 182 are a plurality of the mass exchangers (MX) 100 configured in the gas-to-liquid phase-change mode.

Located in the second region 186 is at least one of the mass exchangers 100 configured in the liquid-to-gas phase-change mode as further described above in conjunction with the description of the second loop 166.

The first loop 184 further includes a reservoir type heat exchanger (e.g. chilled water reservoir) 188, and recirculation pumps 190. The gas flow 102 from gas found in the first region 182 passes through the mass exchangers 100 by which a portion of the gas flow 102 is transferred as a liquid into the liquid flow 104 through each of the mass exchangers thereby adding heat from the gas flow to the liquid flow. The liquid flow 104 moves through the first loop 184 to a reservoir type liquid-to-gas heat exchanger 188 where heat is transferred to a gas working fluid in the third loop 187. The liquid levels of the reservoir type heat exchanger (chilled water reservoir) 188 are controlled through a supply line 192 and a drain line 194 to maintain an adequate amount and temperature of the circulating fluid including the liquid flow in the first loop 184. The recirculation pumps 190 move the circulating fluid through the first loop 184.

The third loop 187 includes the reservoir type heat exchanger 188, the vapor compressor (VC) 160, the heat exchanger (HX) 162, and an expansion valve 164. After the heat exchanger 204 transfers heat to the refrigerant in the third loop 187, at least a portion of the heat is further transferred to the fluid in the second loop 166 as described above. FIG. 12 shows a reservoir type heat exchanger 188 in the first loop 184 and separate heat exchanger 162 and reservoir 168 in the second loop 166. The first loop 184, also known as a chilled water loop, could be designed with a separate heat exchanger and reservoir and conversely the second loop 166, also known as the hot water loop, could use a reservoir type heat exchanger. The selection of the type of heat exchanger is applications and performance based and options include tube-in-tube, shell-and-tube, finned tube, coil-in-reservoir, and plate style exchangers among other choices. The reservoir tank 168 can store chilled water and/or ice for the second loop 166. This water and/or ice later allows the system to circulate cold water and absorb enthalpy from the controlled enclosure for a limited time without needing to engage the third (refrigerant) loop 187. This adds a function to the air conditioner system that is not normally present and if used further increases the efficiency of the system.

Figure 13:
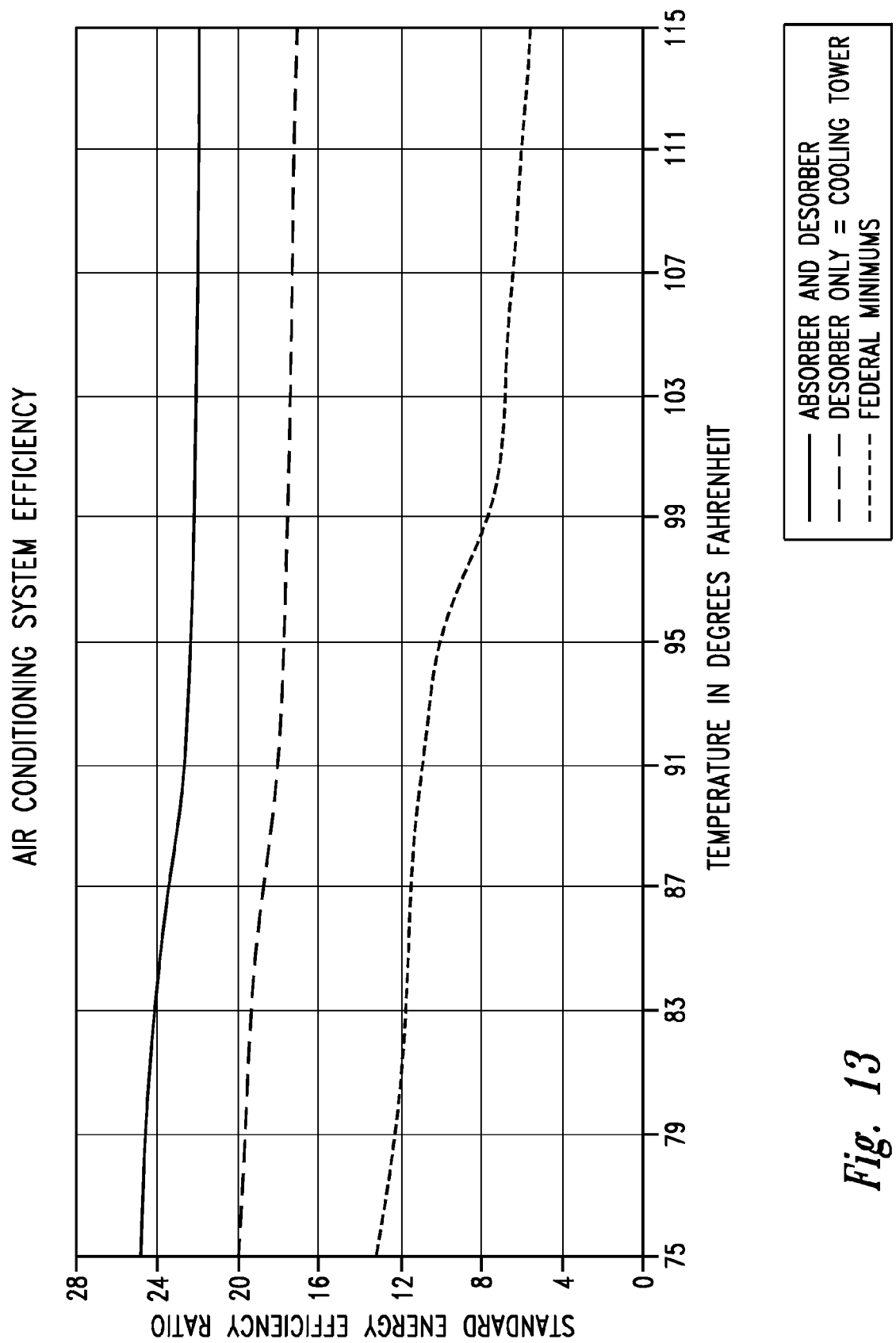
FIG. 13 is a graph of exemplary efficiencies of an implementation of the enhanced HVAC system.

Shown in FIG. 13 is a theoretical model of a system that uses the mass exchangers 100 both in the gas-to-liquid phase-change mode and the liquid-to-gas phase-change mode. The model shows how the annual seasonal energy efficiency ratio varies with outside ambient temperature.

The energy efficiency ratio measures the instantaneous system efficiency and is the cooling capacity in Btu/hr divided by the watts of power consumed for a specific outdoor temperature. The bottom curve is the United States federally mandated 2007 minimum efficiency. The middle curve is the case where the air conditioning system only uses the desorber. This is equivalent to the case where an air conditioning system uses an evaporative cooling tower. The top curve represents the case where an air conditioning system uses both an absorber and desorber. At standard ARI summer conditions of 35 degrees Celsius (95 degrees Fahrenheit) the system will have an energy efficiency ratio of 22 to 23. As can be seen from the curves the air conditioning system is much more tolerant of high ambient operating temperatures using the enthalpy absorber and desorber.

Present implementations are concerned with improving heat transfer to and from air through the use of the phase change of water from a gas to liquid and from liquid to a gas. The mass exchanger 110, also known as a membrane-based enthalpy exchanger, can be used to absorb and desorb sensible and latent heat into the liquid flow 104, such as streams of moving water, to transfer heat from within an enclosure to the outside environment. This process can work in either direction so that if desired heat can be brought into an enclosure from an outside environment.

The system can be configured with additional heat exchangers to transfer heat from the working fluid to external processes (preheaters, hot water tanks, etc.), reducing the workload on the enthalpy desorber when cooling the controlled enclosure. If the system is running in reverse to heat the controlled enclosure, heat exchangers can be used to transfer heat from external sources into the working fluid to reduce the workload of the enthalpy absorber.

For cooling applications that do not involve human habitation, other phase change materials that have proper dielectric constant and dipole moment such as ethanol can be substituted for the water. Other atmospheres such as pure nitrogen or pure argon will also serve to function as carrier for the phase change liquid.

Sensible and latent heat can be absorbed from air that is to be conditioned through the use of the membrane based mass exchanger 100. The mass exchanger 100 can absorb latent, moisture, heat directly from the gas flow 102, such as an air stream that is in thermal communication with air from within an enclosure and absorbs it into the liquid flow 104, such as a first moving stream of cold water. Sensible, temperature, heat is also absorbed by the membrane 110 and absorbed into the liquid flow 104, such as a moving stream of water that is in direct contact with the membrane. This water-borne heat is transferred through a conventional high surface area sensible exchanger such as a tube-in-tube or a spiral coil to a gaseous refrigerant. The hot refrigerant then is mechanically compressed raising its temperature.

The hot refrigerant then goes through another conventional sensible exchanger such as a tube-in-tube or spiral coil transferring its heat to a second stream of water. This second stream is circulated to a second mass exchanger 100 that desorbs sensible and latent energy to an air stream that is in thermal communication with the outside environment. The cooled gaseous refrigerant is expanded through a valve and sent back to the first mass exchanger 100, also known as an enthalpy exchanger. The above process is repeated in a continuous fashion to efficiently condition air with the enclosure.

The use of the mass exchangers 100 brings benefits besides the improvements in efficiency. These benefits stem from the freedom to locate and configure equipment as needed by the application. The refrigerant is typically at high pressure necessitating metal piping and welded joints. This calls for a high degree of skill and a time consuming installation or repair. In one option, the compressor, expansion valve, and two tube-in-tube liquid-to-liquid heat exchangers can be built in the factory as a small, self-contained unit. When installed, the unit will need only to be mechanically secured against the weather and vibration and electrically powered. The mass exchangers 100 can be remotely located where they are most effective or most convenient, needing only a low-pressure water connection to make them functional. The refrigerant unit can even be inside the structure with only the enthalpy desorber located outside.

In the same fashion the mass exchangers 100 can also be located where they are most convenient, preferably inside the conditioned space where additional efficiencies are possible by reducing the duct losses incurred circulating gas (typically air) throughout the enclosure. In the broadest extension of the concept multiple mass exchangers 100 can be located where they would be most effective, eliminating the need for a central air ducting system entirely. This type of installation would provide additional efficiencies in that unused or unoccupied spaces would not be air conditioned until there was a requirement. A retrofit of existing air conditioning systems can also be done such as shown in FIG. 11, where a mass exchanger 100 with hot water recovery can be added to an existing air conditioner air handler unit and sensible coil.

Synergistic Additional Air Conditioning Functions
Heating

Since thermal energy is now being transported by water within the air conditioning system, it is now possible to reverse the water connections and create a heat pump. In this case the enthalpy absorber would become an enthalpy desorber and the enthalpy desorber an enthalpy absorber. Cold water would be circulated out of the enclosure to be warmed by the sensible temperature heat and latent moisture heat from the environment. This heat would then be concentrated and placed into the interior enthalpy exchanger for distribution within the structure. The compressor and refrigerant loop are unaffected by the change in pumping direction. Back-up resistance heating is easily added for extreme weather conditions and the interior enthalpy absorbers can be configured for a sensible only thermal transfer when additional moisture is not needed within the structure.

Thermal Storage

Use of water as a working fluid allows thermal storage strategies to take advantage of variations in cost or availability of energy sources. During periods of low thermal demand, the third (refrigerant) loop 187 is used to create ice within the reservoir type heat exchanger (chilled water reservoir) 188. When cooling demand resumes, this ice is used to cool the first (chilled water) loop 184 without engaging the third (refrigerant) loop 187.

System Reliability and Maintenance

Since the high pressure refrigerant loop can be made as a self contained compact unit, the equipment can be tested and qualified at the factory. This will reduce installation time by eliminating all tube welding, leak checking and refrigerant pressurization. The factory qualification of the equipment will also produce a more reliable system by eliminating installation problems. In addition, the high-pressure refrigerant loop equipment can be designed as a field replaceable part; a part that is potentially customer serviceable. The elimination of the majority of the high-pressure metal piping and sensible metal heat exchangers will decrease the weight and lower the cost of the air conditioning system.

EXPERIMENTAL DATA

Two experimental prismatic plate enthalpy exchangers were designed and built. The first exchanger consisted of 5 layers of the inventive enthalpy membrane separated by machined PVC plastic flow fields. The inventive enthalpy membrane comprised a statistically random ethylene polystyrene co-polymer that was sulfonated to at least 35 mole %. The design of the exchanger allowed air to flow unimpeded across the faces of the membrane. Each membrane layer had an exchange area of approximately 508 cm (200 square inches). The membrane consisted of a 7 micron thick coating of 35 mole % sulfonated, 70 weight % styrenic content, and random block polymer ionomer adhered to 150 micron thick highly porous polyethylene-silica microporous support. A flowing stream of water was distributed across the ionomer face of the membrane. The flow rate is expressed in fractional gallons per minute. The design of the exchanger allowed air to flow unimpeded across the support side of the membrane. Experimental data was gathered to show the exchange of moisture across the membrane for various volumetric air flows.

Example 1

| | | | Enthalpy Absorber | | | | |
|---|---|---|---|---|---|---|---|
| Air Flow cfm | Inlet Air Deg C. | Outlet Air Deg C. | Inlet Air g-H20/ kg dry air | Outlet Air g-H20/ kg dry air | Inlet $H_2O$ Deg C. | Outlet $H_2O$ Deg C. | $H_2O$ Flow gpm |
| 66.8 | 26 | 18.4 | 9.9 | 8.9 | 6.6 | 15.1 | .37 |
| 86.5 | 27.7 | 18.5 | 11.43 | 9.32 | 6.6 | 10.2 | .37 |
| 100.0 | 25.3 | 18.6 | 9.89 | 9.38 | 6.6 | 10.2 | .37 |

As can be seen in the chart the enthalpy absorber cooled and dehumidified the air while warming the water stream. This was done without generating liquid water at the membrane air interface. At 86 cfm the enthalpy absorber removed 18% of the water in the airstream.

Example 2

| | | | Enthalpy Desorber | | | | |
|---|---|---|---|---|---|---|---|
| Air Flow cfm | Inlet Air Deg C. | Outlet Air Deg C. | Inlet Air g-H20/ kg dry air | Outlet Air g-H20/ kg dry air | Inlet $H_2O$ Deg C. | Outlet $H_2O$ Deg C. | $H_2O$ Flow gpm |
| 66.8 | 35 | 29.3 | 9.6 | 18.7 | 32.9 | 28.3 | .37 |
| 86.5 | 35 | 29.1 | 9.2 | 17.7 | 32.9 | 28.0 | .37 |
| 100.0 | 35 | 29.1 | 9.2 | 17.1 | 32.9 | 27.9 | .37 |

As can be seen in chart, the enthalpy desorber cooled the water stream while cooling and humidifying the air. This was done without liquid water being present at the membrane air interface. At 67 cfm the enthalpy desorber increased the amount of water in the air stream by 95%.

Example 3

32-Layer Membrane Prismatic Enthalpy Exchanger

A second enthalpy exchanger was built with 32 membrane layers each with about 508 cm (200 square inches) of transfer area. The plastic PVC flow fields were of a different design but the operational principles of the second exchanger were identical to the first 5-membrane layer exchanger. A test was run on this larger exchanger as an enthalpy desorber. Here 32 degrees Celsius (90 degrees Fahrenheit) water was pumped through the exchanger. The water flow was subdivided by the PVC flow fields such that there was an even flow to each membrane; each membrane receiving up to 11 gallons per minute of water flow. The water flow rate was a variable in the test and is shown as the abscissa on the chart below.

Figure 14:
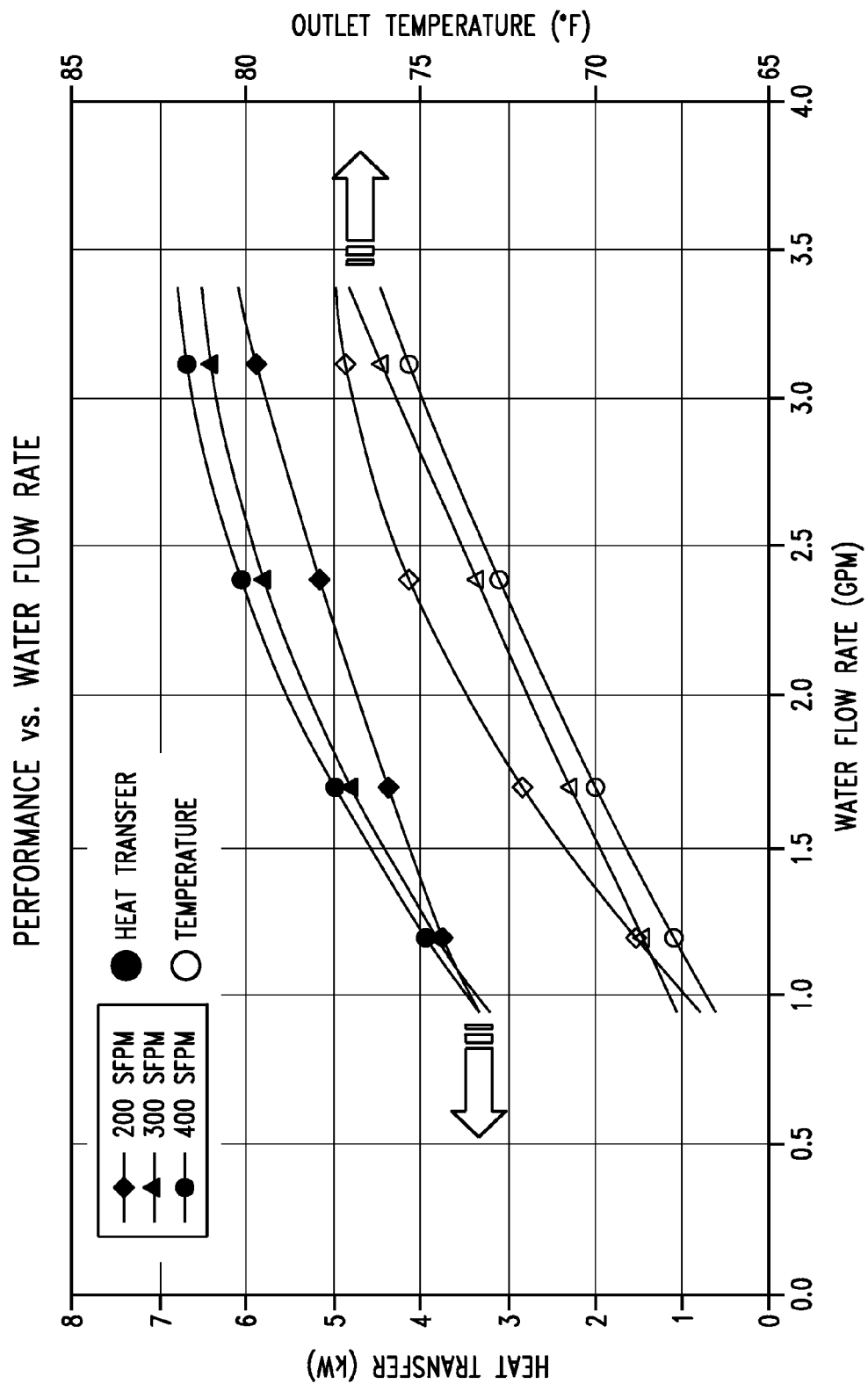
FIG. 14 is a graph of exemplary performance characteristics of an implementation of the mass exchanger.

As shown in FIG. 14, plotted against the water flow rate were several airflows of a known velocity, dry bulb temperature of 35 degrees Celsius (95 degrees Fahrenheit) and humidity expressed a wet bulb temperature of 14 degrees Celsius (58 degrees Fahrenheit) The thermal energy of the absorber was calculated off of the temperature difference between the inlet and outlet water. The face area of the enthalpy exchanger was about 0.5 m (1.64 square feet) so that a volumetric air flow rate could be reduced to a standard linear meter (feet) per minute number. The air flow rate tested were about 60.96 meters (200 feet), 91.44 meters (300 feet), and about 121.92 meters (400 feet) per minute.

The incoming 32 degrees Celsius (90 degrees Fahrenheit) water was cooled down to an outlet temperature of 17 to 26 degrees Celsius (63 to 79 degrees Fahrenheit) depending on the air flow and water flow rate. The outlet water temperature is plotted against the left ordinate of the chart. The energy difference between the incoming and exiting water is plotted against the right ordinate of the chart.

The 32-membrane layer exchanger was able to transfer 3.5 to 7.5 kilowatts of thermal energy depending on water and air flow rates. The enthalpy desorber exhibited a similar performance in terms of efficiency, volumetric heat dissipation, and air flow to a large air conditioning cooling tower but in a compact, easily maintained form.

Membranes

Certain embodiments disclosed herein relate to membrane-based enthalpy exchangers which are utilized for absorbing and/or desorbing sensible and/or latent heat into streams of moving liquid (such as water) to transfer heat from within a target airspace (preferably an enclosed target airspace) to the outside environment, or an exit airspace. The membrane-based enthalpy exchange process is capable of bi-directional operation, such that heat can also be brought into the target airspace from the outside environment, or exit airspace. Thus, in certain embodiments, the target airspace and exit airspace may be interchangeable, depending on the desired goal and direction of operation of the enthalpy exchange process.

In certain embodiments, at least one membrane is utilized in the enthalpy exchanger, comprising at least one moisture transfer membrane. In preferred embodiments, the membrane is impermeable to gases and permeable to liquids (such as water). In particular embodiments, at least one membrane comprises a modified (for example, sulfonated, hydrogenated, dehydrogenated, reduced, imidated and/or amidated) macromolecule. The molecules (including macromolecules) comprising at least one membrane include, but are not limited to, nucleic acids (nucleotides), amino acids, peptides, polypeptides, proteins, glycoproteins, biopolymers, oligomers and/or polymers and/or copolymers containing either alkene and/or arene moieties.

A macromolecule, as used herein, generally refers to a molecule of high relative molecular mass, the structure of which typically comprises multiple repetition of segments derived from other molecules, such as for certain oligomers, polymers, or co-polymers. The molecules utilized in at least one membrane may be naturally occurring, artificial, or any combination thereof. The molecules disclosed may be isolated or in a mixture or solution and/or may be chemically synthesized.

As described inter alia, the molecules utilized in at least one membrane disclosed herein may include, but are not limited to, bio-polymers, oligomers and/or polymers, such as multiphase large molecular chain polymers and/or copolymers. Particular embodiments include, but are not limited to, (a) oligomers and/or polymers and/or copolymers comprising an ion-containing polymer, (b) biopolymers, or (c) block copolymers. In certain embodiments, molecules utilized in at least one membrane described herein comprise an ion-containing oligomeric segment or co-oligomeric segment (ionomer). Typically, ionomers utilized in the present invention relate to polyelectrolyte polymers or copolymers that contain both nonionic repeat units and at least a small amount of ion containing repeating units.

Polymers of various degrees of polymerization are also included in the membranes disclosed herein. As one of skill in the art would readily appreciate, the degree of polymerization generally refers to the number of repeat units or segments in an average polymer chain at a particular time in a polymerization reaction, where length is measured by monomer segments or units. Preferable lengths include, but are not limited to, approximately 500 monomer units, 1000 monomer units, 5000 monomer units, 10,000 monomer units, 25,000 monomer units, 50,000 monomer units, 100,000 monomer units, 200,000 monomer units, 300,000 monomer units, 500,000 monomer units, 700,000 monomer units, or greater or any value there between.

The degree of polymerization may also be a measure of the polymer's molecular weight. Thus, the degree of polymerization is equal to the total molecular weight of the polymer divided by the total molecular weight of the repeating unit or segment. Polymers with different total molecular weights but identical composition may exhibit different physical properties. Generally, the greater the degree of polymerization correlates with the greater melting temperature and greater mechanical strength.

In certain embodiments, the oligomer and/or polymer and/or co-polymer comprises a multiphase large molecular chain molecule. In some embodiments the multiphase large molecular chain oligomers and/or polymers and/or copolymers comprise one or more arene-containing linear side chains, non-arene-containing linear side chains, saturated linear side chains, unsaturated linear side chains, or flexible hydrocarbon linear side chains.

For purposes of this invention, an "alkene moiety" refers to a hydrocarbon chain containing at least one carbon-carbon double bond. An "arene moiety" refers to a monovalent or divalent aryl or heteroaryl group. An aryl group refers to hydrocarbon ring system comprising hydrogen, 6 to 18 carbon atoms and at least one aromatic ring. For purposes of this invention, the aryl group may be a monocyclic, bicyclic, tricyclic or tetracyclic ring system, which may include fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pyrene, and triphenylene. Preferably, an aryl group is derived from benzene. A heteroaryl group refers to a 5- to 14-membered ring system comprising hydrogen atoms, one to thirteen carbon atoms, one to six heteroatoms selected from the group consisting of nitrogen, oxygen and sulfur, and at least one aromatic ring. For purposes of this invention, the heteroaryl group may be a monocyclic, bicyclic, tricyclic or tetracyclic ring system, which may include fused or bridged ring systems; and the nitrogen, carbon or sulfur atoms in the heteroaryl radical may be optionally oxidized; the nitrogen atom may be optionally quaternized. Examples include, but are not limited to, azepinyl, acridinyl, benzimidazolyl, benzindolyl, 1,3-benzodioxolyl, benzofuranyl, benzooxazolyl, benzothiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl(benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, quinuclidinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl).

For purposes of this invention, an "arene-containing linear side chain" refers to an unbranched hydrocarbon chain consisting only of hydrogen or carbon, wherein at least one carbon in the chain is replaced with an aryl or heteroaryl group, as defined above. For purposes of this invention, a "non-arene-containing linear side chain" refers to an unbranched hydrocarbon chain consisting only of hydrogen or carbon and containing no aryl or heteroaryl groups within the chain. For purposes of this invention, a "saturated linear side chain" refers to an unbranched hydrocarbon chain consisting only of hydrogen or carbon comprising at least one carbon-carbon double bond or at least one carbon-carbon triple bond. An "unsaturated linear side chain," as used herein, generally refers to an unbranched hydrocarbon chain consisting only of hydrogen or carbon containing no carbon-carbon double bonds and no carbon-carbon triple bonds.

For purposes of this invention, a "flexible hydrocarbon linear side chain" refers to a flexible connecting component as taught by U.S. Pat. Nos. 5,468,574 and 5,679,482, of which the disclosures of both are hereby incorporated by reference in their entireties.

The weight of the molecules utilized in the disclosed membranes are preferably at least approximately 10,000 Daltons, 15,000 Daltons, 20,000 Daltons, 25,000 Daltons, 30,000 Daltons, 40,000 Daltons, 50,000 Daltons, 60,000 Daltons, 70,000 Daltons, 80,000 Daltons, 90,000 Daltons, 1 KiloDalton, 2 KiloDaltons, 3 KiloDaltons, 4 KiloDaltons, 5 KiloDaltons, or greater or any value there between. Preferably, the size of the molecules is at least approximately 20,000 Daltons, 50,000 Daltons, 75,000 Daltons, 1 KiloDalton, 2 KiloDaltons, or any value there between.

In other embodiments, the measurement of molecular weight may be important. The average range of molecular weight (Mw) of the molecules disclosed herein includes from about 20,000 grams/mole to about 1,000,000 grams/mole, and preferably from about 50,000 grams/mole to 900,000 grams/mole.

In general, ionomers utilized in the membranes of the invention contain both polar and non-polar moieties. The nonpolar moieties of an ionomer are grouped together, while the polar ionic moieties tend to cluster together and separate from the nonpolar polymer backbone moieties. This ionic moiety clustering allows for thermoplasticity of the ionomers. Generally, when ionomers are heated, the ionic moieties will lose their attraction for each other and the moieties will freely move, thus allowing for thermoplastic elastomeric qualities of the ionic polymer or copolymer.

Various types of copolymers, including block copolymers, exist that may be used with the membranes of the invention. For example, alternating copolymers comprise regular alternating A and B chemical or constitutional units; periodic copolymers contain A and B units arranged in a repeating sequence (e.g. $(A-B-A-B-B-A-A-A-B-B)_n$); random copolymers comprise random sequences of monomer A and B units; statistical copolymers comprise an ordering of distinct monomers within the polymer sequence that obeys statistical rules; block copolymers that are comprised of two or more homopolymer subunits linked by covalent bonds and may be diblock, tri-block, tetra-block or multi-block copolymers. (IUPAC, *Pure Appl. Chem.*, 68: 2287-2311 (1996)).

Additionally, any of the copolymers described may be linear (comprising a single main chain), or branched (comprising a single main chain with one or more polymeric side chains). Branched copolymers that have side chains that are structurally distinct from the main chain are known as graft copolymers. Individual chains of a graft copolymer may be homopolymers or copolymers, and different copolymer sequencing is sufficient to define a structural difference. For example, an A-B diblock copolymer with A-B alternating copolymer side chains is considered a graft copolymer. Other types of branched copolymers include star, brush and comb copolymers. Any one of these copolymers, or any mixture thereof, may be utilized with certain embodiments disclosed herein.

In certain embodiments disclosed herein, the molecule(s) utilized in the membranes disclosed herein comprises a polymer comprised of at least one block. In certain embodiments, the molecule is a thermoplastic block copolymer. In other embodiments, the molecule is a block copolymer that comprises differentiable monomeric units. Preferably, at least one of the monomeric units of the block copolymer comprises an arene moiety-containing unit. In other preferred embodiments, at least one block comprises a non-arene moiety-containing unit. In certain embodiments, the block copolymer comprises at least two monomeric units arranged in statistically random order. In other embodiments, the block copolymer comprises at least two monomeric units arranged in ordered sequence. In certain embodiments, the molecule utilized in the processes disclosed herein includes not only polymers or block copolymers, but also copolymers with other ethylenically unsaturated monomers (such as acrylonitrile, butadiene, methyl methacrylate, etc.).

In certain embodiments disclosed herein, a block copolymer refers to a block copolymer having at least a first block of one or more mono alkene-arene moiety, such as styrene, ring-substituted styrene, α-substituted styrene, and any combination thereof; and a second block of a controlled distribution copolymer of a diene moiety and a mono alkene-arene moiety. The block copolymer can be any configuration of "A" and "B" blocks, and such block copolymers can be generated by methods known in the art.

For purposes of this invention, a "mono alkene-arene moiety" refers to one or more alkene moieties, as defined above, covalently bonded to an arene moiety, as defined above. An example of a "mono alkene-arene moiety" is styrene. A "poly alkene-arene moiety" refers to a two or more mono alkene-arene moieties, as defined above, covalently bonded to each other to form a chain comprising two or more mono alkene-arene moieties. An example of a "poly alkene-arene moiety" is polystyrene. A "diene moiety" refers to a hydrocarbon chain containing two carbon-carbon double bonds. In certain embodiments, the diene moiety may be conjugated, unconjugated, or cumulated.

Some specific examples of block copolymers include those described in U.S. Pat. Nos. 4,248,821; 5,239,010; 6,699,941; 7,186,779; 7,169,850; 7,169,848; 7,067,589; 7,001,950 and 6,699,941 and U.S. Patent Application Publication Nos.: 20070021569; 20050154144; 20070004830; 20070020473; 20070026251; 20070037927; and 20070055015, all of which are hereby incorporated by reference in their entireties.

In certain embodiments, the molecule comprises a statistical copolymer. A statistical copolymer is used herein consistent with the commonly understood usage in the art (see, for example, G. Odian, Principles of Polymerization, 1991). Statistical copolymers are derived from the simultaneous polymerization of two monomers and have a distribution of the two monomeric units along the copolymer chain, which follows Bernoullian (zero-order Markov), or first or second order Markov statistics. The polymerization may be initiated by free radical, anionic, cationic or coordinatively unsaturated (e.g., Ziegler-Natta catalysts) species. According to Ring et al., (Pure Appl. Chem., 57, 1427, 1985), statistical copolymers are the result of elementary processes leading to the formation of a statistical sequence of monomeric units that do not necessarily proceed with equal probability.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature typically reflects homogeneity at the molecular level. An additional consequence of this homogeneity is that statistical copolymers, such as those of styrene and butadiene, when viewed by electron microscopy, display a single phase morphology with no microphase separation. By contrast, block and graft copolymers of styrene/butadiene, for example, are characterized by two glass transition temperatures and separation into styrene-rich domains and butadiene-rich domains, particularly when unmodified. It should be noted that membranes of the invention which are produced from statistical copolymers originally having a single glass transition temperature and a single phase morphology do not necessarily exhibit a single phase morphology or a single glass transition temperature after sulfonation or other modification.

Pseudo-random copolymers are a subclass of statistical copolymers which result from a weighted change in the monomer incorporation that skews the distribution from a random arrangement (i.e. Bernoullian) is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be monomeric units comprising diblock, triblock, graft-block, multi-arm starblock, multiblock, segmented, tapered block, or any combination thereof.

One particular advantage provided by certain embodiments includes the ability to apply the disclosed process to non-styrenic high molecular weight polymers. Thus, in certain embodiments disclosed herein, the molecules utilized in the membranes disclosed do not comprise a mono alkene—arene moiety or segment, such as a styrene segment. In certain other embodiments disclosed herein, polymers utilized in the processes disclosed do not contain poly alkene—arene moieties or segments, such as polystyrene. In certain such embodiments, the polymer includes moieties or segments comprising unsaturated carbon-carbon double bonds, which are able to be sulfonated. Some examples of such polymers include, but are not limited to polybutadiene or polyisoprene.

In particular, certain embodiments disclosed herein relate to membranes comprising molecules which have been modified (such as by sulfonation, amidization, or other modification), the molecules comprising one or more of the following moieties: alkane, alkene, alkyne, and arene, each of which may be optionally substituted by one or more of the following functional groups: carboxylic acid, urea, ester, urethane (carbamate), alkene, amide, benzene, pyridine, indole, carbonate, thioester, arcylate/acrylic, ether, amidine, ethyl, acid versions of aliphatic compounds that contain alkenes, alkanes or alkynes, imidazole, oxazole, and other possible combinations of heteroatom containing groups susceptible to loss of water and/or disassembly. Each of the terms listed above has its standard definition known to one skilled in the art.

In certain embodiments, the molecules are uniformly modified (preferably sulfonated) from approximately 10%, 20%, 30%, 40%, 50%, 60%, 70%, 80%, 85%, 90%, 91%, 92%, 93%, 94%, 95%, 96%, 97%, 98%, 99% by weight, or greater or any value there between.

In certain preferable embodiments, the membrane has no net charge, but retains a high charge density comprising a balance of covalently bound positive charges and free negative ions (for example, in the case of sulfonation), or covalently bound negative charges and free positive ions (for example, in the case of amidization). In certain preferable embodiments, the membrane comprises an ionomeric polymer with an equivalent acid weight of about 2500, about 2000, about 1500, about 1200, about 1000, about 800, about 500, about 300, about 200, about 100, or less, or any value therebetween. In certain embodiments, the ionomeric polymer membranes exhibit high selectivity for water, and form uniform thin structures that can be free standing or laminated to a support . In certain embodiments, the ionomer polymers allow radiation or chemical crosslinking to immobilize the molecules within the membrane and confer particular mechanical and/or permeation properties.

In certain preferred embodiments, the ionomeric membranes can exclude many airborne organic and/or inorganic particulates and/or gases such as oxygen, nitrogen, argon, helium, carbon dioxide, and others, while selectively transferring water and/or other liquids.

Some specific examples of molecules or molecule moieties or segments that may be utilized for membranes disclosed herein include but are not limited to polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polytetrafluoroethylene (PTFE) (such as Gore-Tex®), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, Nafion® (sulfonated tetrafluorethylene copolymer), and any combination of these or others. In a preferred embodiment, the membrane comprises sulfonated polystyrene co-polymer. In a specifically preferred embodiment, the mebrane comprises a statistically random ethylene polystyrene co-polymer sulfonated to at least 10 mole %, at least 20 mole %, at least 30 mole %, at least 35 mole %, at least 40 mole%, at least 50 mole %, at least 60 mole %, or greater or any value therebetween.

Other examples of materials that may be utilized for the membranes described herein are described in the following issued U.S. patents and pending patent applications, all of which are incorporated by reference in their entireties: U.S. Pat. Nos. 5,794,82; 5,468,574; 6,110,616; 6,413,294; 6,383,391; 6,413,298; 6,841,601; 7,179,860; and PCT/US04/30936.

Support Structure

In one particular preferred embodiment, the at least one membrane comprises a layer of ionomeric organic-inorganic hybrid polymers optionally joined to at least one hydrophobic and/or hydrophilic support structure, which provides physical and/or chemical reinforcement for the membranes, in certain embodiments. In certain embodiments, the support structure is absent. In certain embodiments, at least one support structure is physically and/or chemically joined to the at least one membrane(s). In certain embodiments, the support structure may be hydrophobic and/or hydrophilic, or any combination of these, depending on the specific requirements of the application and the desired goal.

In certain embodiments, the support structure may be porous, which allows for the transfer of gas(es) across the support. The porosity of the support structure can vary from about 5%, about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or greater or any value therebetween. In one embodiment, the support structure comprises silica, in another embodiment, the support structure comprises polyethylene silica. These types of porous materials are available from companies such as W.L. Gore (such as microfiltration media membranes), the Daramic Corporation (polypropylene and polyethylene separators), and Sepro Membranes (microfiltration membrane PVDF-MFB).

Phase-Change Materials

Any gas and/or liquid may be utilized in the HVAC system disclosed herein. For example, for certain embodiments, phase change materials may include liquid and/or gaseous forms of the following water, ethanol, methanol, ammonia, and others. The materials utilized in the refrigerant loop may include these as well as others, such as argon, nitrogen, carbon dioxide, oxygen, hydrogen, helium, air, nitrous oxide, chlorofluorocarbons (CFCs), neon, krypton, xenon, radon, haloalkanes, methane, ammonia, sulfur dioxide, petroleum gas (including liquefied petroleum gas (LPG)) (such as propane and/or butane), and any combination of these. Certain of these phase change materials may release in the heating and/or cooling process liquids and/or gases that may be harmful to animals, including humans. Thus, certain of these phase-change materials would be used for heating and/or cooling non-habitat airspace (such as for cooling airspace containing electronic equipment).

Enthalpy Absorber

The enthalpy absorber increases the efficiency of the HVAC system in a number of ways, such as by raising the refrigerant temperature required to dehumidify and/or heat and/or cool the target airspace. The enthalpy absorber described herein does not produce condensation in the typical sense as occurs with HVAC systems presently on the market. Instead, vapor (such as water vapor) is absorbed across the membrane and is condensed directly into the moving liquid (e.g. water) stream on the other side of the membrane. The lack of physical condensation on the membrane surface results in continued transfer of additional moisture without blockage at the membrane due to accumulation of condensation products. Furthermore, moisture cannot re-evaporate back into the moving gas (e.g. air) stream. The lack of droplet condensation and re-evaporation increases the net effectiveness of the absorber. In addition, the absorber does not require drip plates and/or water drains for condensation products due to the lack of condensation on the membrane surface.

Figure 15:
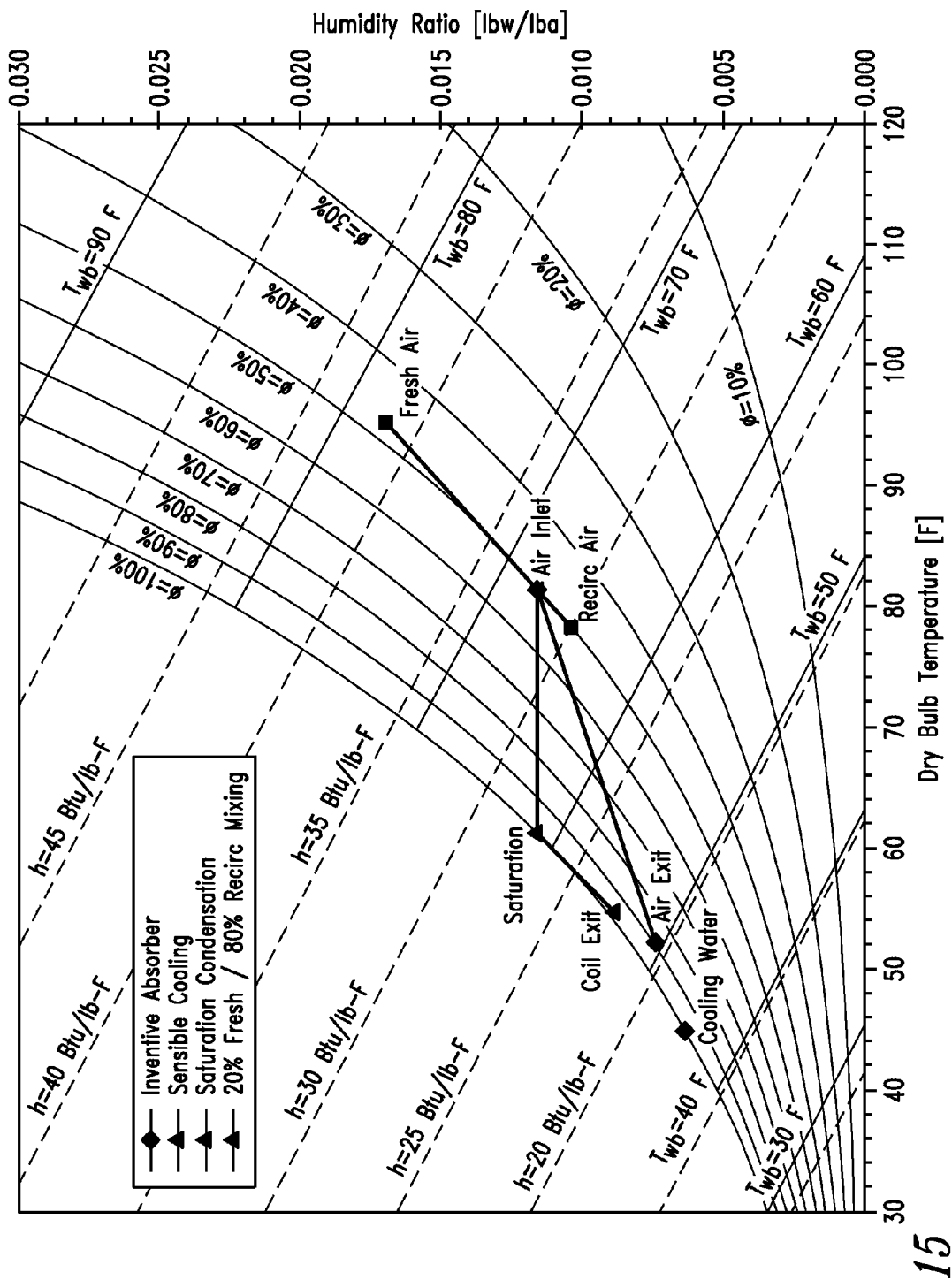
FIG. 15 is a psychometric chart used to describe exemplary performance of a gas-to-liquid phase change mass exchanger (an enthalpy absorber) within the enhanced HVAC system.

FIG. 15 is a psychometric chart that compares a sensible only a/c evaporator and enthalpy absorber. In this example, using a 20% fresh air mix, a sensible exchanger with a 7 degrees Celsius (45 degrees Fahrenheit) water refrigerant yields a saturated air stream with a dry bulb air reading of about 12.8 degrees Celsius (55 degrees Fahrenheit). An enthalpy absorber will give a dry bulb reading of 11 degrees Celsius (52 degrees Fahrenheit) at a relative humidity of 90%. Expressed in enthalpy efficiency, the sensible condensing evaporator is 63% effective and enthalpy absorber is 80% effective. Due to the high efficiency of the enthalpy absorber evaporator, the temperature of the liquid (e.g. water) refrigerant may be increased to about 12-13 degrees Celsius (55 degrees Fahrenheit), which reduces the mechanical work required of the compressor.

The ability of the enthalpy absorber to utilize water allows the enthalpy absorber to be used in remote locations; not directly adjacent to the compressor as is the common practice in today's small air conditioning systems. The utilization of water also allows the absorber function to be sub-divided into several smaller units which may be placed wherever they are required. Thus, absorbers can be placed in every room of a building, and each room could maintain an individual temperature and humidity. Such individualized control has not previously been possible with other HVAC systems, as extensive piping of the high-pressure refrigerant and installation of water drains was required.

Further, direct control of humidity is possible with the hydronic air conditioner of the invention. For example, by slowing the velocity of the gas (e.g. air) stream, the absorber will dehumidify the gas (e.g. air) down to the wet bulb temperature of the cool liquid (e.g. water) stream, removing humidity from the gas (e.g. air). This allows for humidity control of each room in a building or other target airspace to be controlled by regulating the velocity of the gas (e.g. air) and the liquid (e.g. water) stream temperature through the enthalpy exchanger.

Enthalpy Desorber

The enthalpy desorber provides for desorption of moisture from a moving stream of liquid (i.e. water) that has a higher temperature than the wet bulb temperature of the moving gas (e.g. air) stream in contact with the membrane. Each enthalpy desorber comprises at least one membrane that separates a moving stream of liquid (water) and a moving stream of gas (e.g. air). In certain embodiments, the ionomeric polymer membrane layer and optional support structure creates a selectively permeable barrier. At least one membrane has the ability to exclude many airborne organic and inorganic particulates and gases, while selectively transferring liquids (e.g. water). Thus, the membrane allows for desorption of moisture from a moving stream of liquid (e.g. water) that has a higher temperature than the dew point of the moving gas (e.g. air) stream in contact with the membrane.

The membrane reduces required maintenance for the HVAC system, since the membrane protects the refrigerant liquid (e.g. water) from contamination and the preferred embodiment of the membrane reduces or eliminates the need for chemicals to prevent microbiological contamination (such as, microbes including mold and/or bacterial growth). The average dissolved solids content of the circulating liquid (salts and/or metals and/or other agents) is maintained below concentrations that leave scale or deposits, and the steady flow of liquid past the membrane eliminates local stagnant regions common to surface evaporators, ensuring the liquid never evaporates completely and deposits solids on the heat transfer surface that force maintenance. In addition, the enthalpy absorber absorbs moisture from the target airspace and produces membrane-filtered water that can be recovered and pumped back into the reservoir of the hot water loop, which reduces the concentration of dissolved solids circulating through the enthalpy desorber. In certain embodiments, the membrane-filtered water may be free from dissolved solids, microorganisms, and other biological and/or chemical impurities. This control over concentration levels and evaporation surfaces allows significant reduction or preferably elimination of anti-scaling additives in the liquid without the creation of local deposits.

At these concentrations, the vapor pressure of the fluid is not greatly affected by solids content and the ability of the membrane to transport moisture is largely independent of the dissolved solids content. Thus, variations of dissolved solids within the liquid (i.e. water) do not impair the membrane's capabilities, and the reduction in chemical additives used to control biological fouling, scale, and deposits allows for disposal of the circulating water in a municipal drain.

Heating a Target Airspace

As disclosed in other sections elsewhere herein, thermal energy is transported by liquid (i.e. water) within the HVAC system, thus it is possible to reverse the liquid (i.e. water) connections, thereby creating a heat pump from the HVAC system. In this case, the enthalpy absorber and desorber would reverse roles (that is, the enthalpy desorber becomes an enthalpy absorber, and vice versa). In one exemplary embodiment, cold liquid (such as water) would be warmed by the sensible heat and latent moisture heat from the outside environment or exit airspace. This heat could be concentrated and placed into the interior enthalpy exchanger for distribution within the target airspace. The compressor and refrigerant loop are unaffected by the change in pumping direction. In other embodiments, the interior enthalpy absorbers can be configured for a sensible only thermal transfer when additional moisture is not needed within the target airspace.

All of the above U.S. patents, U.S. patent application publications, U.S. patent applications, foreign patents, foreign patent applications and non-patent publications referred to in this specification and/or listed in the Application Data Sheet, are incorporated by reference in their entireties.

From the foregoing it will be appreciated that, although specific embodiments of the invention have been described herein for purposes of illustration, various modifications may be made without deviating from the spirit and scope of the invention.

It is claimed:

1. A system comprising:
    a mass exchanger having a first surface and a second surface and including a selective transport membrane comprising an ionomeric polymer;
    a gas flow structure configured to direct a flow of a gas mixture to pass by in contact with the first surface of the mass exchanger; and
    a liquid flow structure configured to direct a flow of a liquid mixture to pass by in contact with the second surface of the mass exchanger, the mass exchanger configured to receive a first gas out of the gas mixture including at least the first gas and a second gas and to transfer the first gas therethrough to the second surface to be accepted by the liquid mixture without transferring the second gas therethrough when the gas mixture is in contact with the first surface, when the liquid mixture is in contact with the second surface, and when the gas mixture and the liquid mixture have first predetermined conditions, the mass exchanger configured to receive the first gas from the liquid mixture and to transfer the first gas therethrough from the second surface to the first surface to be accepted by the gas mixture when the liquid mixture is in contact with the second surface, when the gas mixture is in contact with the first surface, and when the gas mixture and the liquid mixture have second predetermined conditions.

2. The system of claim 1 further including a heat exchanger having an intake and an exit, the heat exchanger coupled to receive flow of the liquid mixture into the intake of the heat exchanger and output flow of the liquid from the exit of the heat exchanger.

3. The system of claim 2 wherein the liquid flow structure has an intake and an exit, the liquid flow structure configured to direct the flow of the liquid mixture from the intake to the exit.

4. The system of claim 3 wherein the liquid flow structure is coupled to the heat exchanger for the intake of the liquid flow structure to receive flow of the liquid mixture from the exit of the heat exchanger.

5. The system of claim 3 wherein the liquid flow structure is coupled to the heat exchanger for the intake of the heat exchanger to receive flow of the liquid mixture from the exit for the liquid flow structure.

6. The system of claim 1 wherein the selective transport membrane has a first surface and a second surface, the first surface of the mass exchanger being the first surface of the selective transport membrane and the second surface of the mass exchanger being the second surface of the selective transport membrane.

7. The system of claim 1 wherein the selective transport membrane has a first surface and a second surface, and the mass exchanger further comprises a porous support having a first surface and a second surface, the second surface of the selective transport membrane being positioned adjacent to the first surface of the porous support, the first surface of the mass exchanger being the first surface of the selective transport membrane and the second surface of the mass exchanger being the second surface of the porous support.

8. The system of claim 1, wherein the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers, poly(methyl methacrylate) (PMMA), acrylonitrile butadiene styrene (ABS), polyimide (PA), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, sulfonated tetrafluorethylene copolymer, and any combination thereof.

9. The system of claim 7 wherein the porous support structure includes a porosity of at least about 30%.

10. A system comprising:
a mass exchanger having a first surface and a second surface, wherein the mass exchanger includes a selective transport membrane having a first surface and a second surface and a porous support having a first surface and a second surface, the second surface of the selective transport membrane being positioned adjacent to the first surface of the porous support, the first surface of the mass exchanger being the first surface of the selective transport membrane and the second surface of the mass exchanger being the second surface of the porous support, wherein the porous support includes polethylene silica and has a porosity of at least about 30%;
a gas flow structure configured to direct a flow of a gas mixture to pass by in contact with the first surface of the mass exchanger; and
a liquid flow structure configured to direct a flow of a liquid mixture to pass by in contact with the second surface of the mass exchanger, the mass exchanger configured to receive a first gas out of the gas mixture including at least the first gas and a second gas and to transfer the first gas therethrough to the second surface to be accepted by the liquid mixture without transferring the second-gas therethrough when the gas mixture is in contact with the first surface, when the liquid mixture is in contact with the second surface, and when the gas mixture and the liquid mixture have first predetermined conditions, the mass exchanger configured to receive the first gas from the liquid mixture and to transfer the first gas therethrough from the second surface to the first surface to be accepted by the gas mixture when the liquid mixture is in contact with the second surface, when the gas mixture is in contact with the first surface, and when the gas mixture and the liquid mixture have second predetermined conditions.

11. The system of claim 1 wherein the mass exchanger includes a selective transport membrane having a first surface and a second surface and a porous support having a first surface and a second surface, the second surface of the porous support being positioned adjacent to the first surface of the selective transport membrane, the first surface of the mass exchanger being the first surface of the porous support and the second surface of the mass exchanger being the second surface of the selective transport membrane.

12. The system of claim 11 wherein the porous support structure includes a porosity of at least about 30%.

13. A system comprising:
a mass exchanger having a first surface and a second surface, wherein the mass exchanger includes a selective transport membrane having a first surface and a second surface and a porous support having a first surface and a second surface, the second surface of the porous support being positioned adjacent to the first surface of the selective transport membrane, the first surface of the mass exchanger being the first surface of the porous support and the second surface of the mass exchanger being the second surface of the selective transport membrane, wherein the porous support includes polethylene silica and has a porosity of at least about 30%;
a gas flow structure configured to direct a flow of a gas mixture to pass by in contact with the first surface of the mass exchanger; and
a liquid flow structure configured to direct a flow of a liquid mixture to pass by in contact with the second surface of the mass exchanger, the mass exchanger configured to receive a first gas out of the gas mixture including at least the first gas and a second gas and to transfer the first gas therethrough to the second surface to be accepted by the liquid mixture without transferring the second gas therethrough when the gas mixture is in contact with the first surface, when the liquid mixture is in contact with the second surface, and when the gas mixture and the liquid mixture have first predetermined conditions, the mass exchanger configured to receive the first gas from the liquid mixture and to transfer the first gas therethrough from the second surface to the first surface to be accepted by the gas mixture when the liquid mixture is in contact with the second surface, when the gas mixture is in contact with the first surface, and when the gas mixture and the liquid mixture have second predetermined conditions.

14. A method comprising:
providing a system according to claim 7;
exposing the first surface of the selective transport membrane to a gas mixture including at least a first gas and a second gas;
transferring a portion of the first gas through the selective transport membrane without substantially transferring the second gas;
transferring the portion of the first gas through the porous support without substantially transferring the second gas;
exposing the second surface of the porous support to a first liquid; and
accepting the portion of the first gas into the first liquid as a second liquid.

15. The method of claim 14 wherein providing the porous support includes providing the porous support with at least some surface portions that are substantially hydrophobic.

16. The method of claim 15 wherein exposing the porous support to a first liquid includes exposing as a flow of the first liquid.

17. The method of claim 15 wherein exposing the selective transport membrane to a gas mixture includes exposing as a flow of the gas mixture.

18. The method of claim 15 wherein the first gas is substantially polar and the second gas is substantially non-polar.

19. The method of claim 15 wherein the first gas is water vapor and the second gas is oxygen.

20. The method of claim 15 wherein the first liquid is water.

21. The method of claim 15 wherein the second liquid is water.

22. A method comprising:
providing a system according to claim 11;
exposing the first surface of the porous support to a gas mixture including at least a first gas and a second gas;
transferring a portion of the first gas and the second gas through the porous support;
transferring the portion of the first gas through the selective transport membrane without substantially transferring the second gas;
exposing the second surface of the selective transport membrane to a first liquid; and
accepting the portion of the first gas into the first liquid as a second liquid.

23. A method comprising:
providing a system according to claim 7;
exposing the first surface of the selective transport membrane to a liquid;
transferring a portion of the liquid through the selective transport membrane as a first gas;
transferring the first gas through the porous support;
exposing the second surface of the porous support to a second gas; and
accepting the first gas into the second gas.

24. The method of claim 23 wherein the portion of the liquid has a chemical composition different than at least some other portions of the liquid.

25. The method of claim 23 wherein the first gas is water vapor and the second gas is air.

26. A method comprising:
providing a system according to claim 11;
exposing the first surface of the porous support to a liquid;
transferring a portion of the liquid through the porous support as a first gas;
transferring the first gas through the selective transport membrane;
exposing the second surface of the selective transport membrane to a second gas; and
accepting the first gas into the second gas.

27. The method of claim 26 wherein providing the porous support includes providing the porous support with at least some surface portions that are substantially hydrophobic.

28. The method of claim 27 wherein the liquid is water.

29. A system comprising:
a plurality of units coupled together to each receive a flow of a liquid mixture and a flow of a gas mixture, each unit including:
a mass exchanger having a first surface and a second surface and including a selective transport membrane comprising an ionomeric polymer;
a gas flow structure configured to direct at least a portion of the flow of a gas mixture to pass by in contact with the first surface of the mass exchanger; and
a liquid flow structure configured to direct at least a portion of the flow of the liquid mixture to pass by in contact with the second surface of the mass exchanger, the mass exchanger configured to receive a first gas out of the gas mixture including at least the first gas and a second gas and to transfer the first gas therethrough to the second surface to be accepted by the liquid mixture without transferring the second gas therethrough when the gas mixture is in contact with the first surface, when the liquid mixture is in contact with the second surface, and when the gas mixture and the liquid mixture have first predetermined conditions, the mass exchanger configured to receive the first gas from the liquid mixture and to transfer the first gas therethrough from the second surface to the first surface to be accepted by the gas mixture when the liquid mixture is in contact with the second surface, when the gas mixture is in contact with the first surface, and when the gas mixture and the liquid mixture have second predetermined conditions.

* * * * *